United States Patent
Ma et al.

(10) Patent No.: US 12,526,402 B2
(45) Date of Patent: *Jan. 13, 2026

(54) IMAGE COMPONENT PREDICTION METHOD, ENCODER, DECODER, AND STORAGE MEDIUM

(71) Applicant: GUANGDONG OPPO MOBILE TELECOMMUNICATIONS CORP., LTD., Dongguan (CN)

(72) Inventors: Yanzhuo Ma, Dongguan (CN); Junyan Huo, Dongguan (CN); Shuai Wan, Dongguan (CN); Wei Zhang, Dongguan (CN)

(73) Assignee: GUANGDONG OPPO MOBILE TELECOMMUNICATIONS CORP., LTD., Dongguang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/781,956

(22) Filed: Jul. 23, 2024

(65) Prior Publication Data
US 2024/0380883 A1    Nov. 14, 2024

Related U.S. Application Data

(63) Continuation of application No. 17/480,865, filed on Sep. 21, 2021, now Pat. No. 12,137,204, which is a
(Continued)

(51) Int. Cl.
*H04N 19/105*    (2014.01)
*H04N 19/159*    (2014.01)
(Continued)

(52) U.S. Cl.
CPC .......... *H04N 19/105* (2014.11); *H04N 19/159* (2014.11); *H04N 19/176* (2014.11); *H04N 19/186* (2014.11)

(58) Field of Classification Search
CPC .. H04N 19/186; H04N 19/159; H04N 19/176; H04N 19/105
See application file for complete search history.

(56) References Cited

U.S. PATENT DOCUMENTS

| | | | |
|---|---|---|---|
| 9,462,273 B2 | 10/2016 | Zhang | |
| 10,225,573 B1 | 3/2019 | Mukherjee | |

(Continued)

FOREIGN PATENT DOCUMENTS

| | | | |
|---|---|---|---|
| CN | 103200401 A | 7/2013 | |
| CN | 106210747 A | 12/2016 | |

(Continued)

OTHER PUBLICATIONS

First Office Action of the Indonesian application No. P00202109020, issued on Jan. 22, 2024, 5 pages with English translation.
(Continued)

*Primary Examiner* — On S Mung
(74) *Attorney, Agent, or Firm* — BAYES PLLC

(57) ABSTRACT

Provided are a method for predicting a colour component, an encoder and a decoder. The method includes: a first reference sample set of a colour component to be predicted of a current block is determined; a reference sample subset is determined from the first reference sample set, where the reference sample subset includes one or more candidate samples selected from the first reference sample set; and a model parameter of a prediction model is calculated according to positions of reference samples in the reference sample subset, where the prediction model is configured to perform prediction processing on the colour component to be predicted of the current block.

20 Claims, 11 Drawing Sheets

---

A first reference pixel set of a colour component to be predicted of a current block is determined — S101

A reference pixel subset is determined from the first reference pixel set, the reference pixel subset including one or more candidate pixels selected from the first reference pixel set — S102

A model parameter of a prediction model is calculated using the reference pixel subset, the prediction model being configured to perform cross-component prediction processing on the colour component to be predicted of the current block — S103

Related U.S. Application Data continuation of application No. PCT/CN2019/113765, filed on Oct. 28, 2019.

(60) Provisional application No. 62/823,609, filed on Mar. 25, 2019.

(51) Int. Cl.
　　H04N 19/176　　(2014.01)
　　H04N 19/186　　(2014.01)

(56) References Cited

U.S. PATENT DOCUMENTS

| | | | |
|---|---|---|---|
| 2006/0050972 | A1 | 3/2006 | Reznic |
| 2015/0365684 | A1 | 12/2015 | Chen et al. |
| 2016/0219283 | A1 | 7/2016 | Chen |
| 2017/0127081 | A1 | 5/2017 | Yoshikawa et al. |
| 2019/0149836 | A1 | 5/2019 | Moon et al. |

FOREIGN PATENT DOCUMENTS

| | | | |
|---|---|---|---|
| CN | 107147911 | A | 9/2017 |
| CN | 107580222 | A | 1/2018 |
| CN | 108600749 | A | 9/2018 |
| CN | 109417619 | A | 3/2019 |
| EP | 3092803 | B1 | 12/2018 |
| JP | 2018056685 | A | 4/2018 |
| JP | 2019530345 | A | 10/2019 |
| JP | 2019531029 | A | 10/2019 |
| WO | 2018056603 | A1 | 3/2018 |
| WO | 2018067732 | A1 | 4/2018 |

OTHER PUBLICATIONS

Non-Final Office Action of the U.S. Appl. No. 17/480,865, issued on Oct. 4, 2023, 33 pages.
Notice of Allowance of the U.S. Appl. No. 17/480,865, issued on Apr. 22, 2024, 25 pages.
Correction of Notice of Allowance of the U.S. Appl. No. 17/480,865, issued on Jun. 13, 2024, 6 pages.
First Office Action of the Chinese application No. 202111193882.4, issued on Nov. 3, 2022.
Hearing Notice of the Indian application No. 202117042556, issued on Jul. 29, 2024, 2 pages with English translation.
Result of Consultation of the European application No. 19921790.2, issued on Sep. 5, 2024, 11 pages.
Notice of Rejection of the European application No. 19921790.2, issued on Oct. 14, 2024, 22 pages.
Minutes of the Oral Proceedings before the Examining Division of the European application No. 19921790.2, issued on Oct. 11, 2024, 5 pages.
Notice of Rejection of the Japanese application No. 2021-556936, issued on Mar. 15, 2024, 16 pages with English translation.
Oral Proceedings of the European application No. 19921790.2, issued on Sep. 11, 2023, 10 pages.
Xiang Ma, et al., "CE3: CCLM/MDLM using simplified coefficients derivation method (Test 5.6.1, 5.6.2 and 5.6.3)", Document: JVET-L0340_r1,[online], Joint Video Experts Team (JVET) of ITU-T SG 16 WP 3 and ISO/IEC JTC 1/SC 29/WG 11, JVET-L0340 (version 5),Oct. 3-12, 2018, pp. 1-6, 6 pages.
Jangwon Choi, et al., "CE3-related : Reduced number of reference samples for CCLM parameter calculation", Document: JVET-L0138-v2, [online], Joint Video Experts Team (JVET) of ITU-T SG 16 WP 3 and ISO/IEC JTC 1/SC29/WG 11, JVET-L0138 (version 3), Oct. 3-12, 2018, pp. 1-5, 5 pages.

First Office Action of the Japanese application No. 2021-556936, issued on Sep. 26, 2023, 25 pages with English translation.
First Office Action of the Korean application No. 10-2021-7034571, issued on Feb. 17, 2025, 11 pages with English translation.
Office Action of the Indian application No. 202117042556, issued on Mar. 30, 2022.
Chen J et al:"Algorithm description of Joint Exploration Test Model 7 (JEM7)", 7. JVET Meeting; Jul. 13, 2017-Jul. 21, 2017; Torino; (The Joint Video Exploration Team of ISO/IEC JTC1/SC29/WG11 and ITU-TSG. 16 ), Jul. 13, 2017-Jul. 21, 2017; Torino, No. G1001_v1; JVET-G1001 Aug. 19, 2017 (Aug. 19, 2017), pp. 1-48, XP030150980, Retrieved from the Internet: URL:http://phenix.int-evry.fr/jvet/doc_end_user/documents/7 Torino/wg11/JVET-G1001-v1 .zip JVET-G1001-v1 .docx [retrieved on Aug. 19, 2017].
Kai Zhang et al:"Enhanced Cross-Component Linear Model for Chroma Intra-Prediction in Video Coding", IEEE Transactions On Image Processing, vol. 27, No. 8, Aug. 1, 2018 (Aug. 1, 2018 ), pp. 3983-3997, XP055667869, USA ISSN: 1057-7149 DOI: 10.1109/TIP.2018.2830640.
Zhang Kai et al: "Multi-model based cross-component linear model chroma intra-prediction for video coding", 2017 IEEE Visual Communications and Image Processing (VCIP), IEEE, Dec. 10, 2017 (Dec. 10, 2017), pp. 1-4, XP033325781, DOI: 10.1109/VCIP.2017.8305103 [retrieved on Feb. 28, 2018].
J-Y Huo et al:"CE3-related:Fixed Reference Samples Design for CCLM", 125. MPEG Meeting; Jan. 14, 2019-Jan. 18, 2019; Marrakech; (Motion Picture Expert Group or ISO/IEC JTC1/SC29/WG11 ), No. m45477 Jan. 10, 2019 (Jan. 10, 2019), XP030213414, Retrieved from the Internet: URL:http://phenix.int-evry.fr/mpeg doc_end_user/documents/125_Marrakech/wg11/m45477-JVET-M0211-v2-JVET _M0211-v2.zip JVET M0211 -v2/ JVET-M0211-v2.docx [retrieved on Jan. 10, 2019].
Hanhart (Interdigital) Pet al:"Non-CE3: MDLM template downsampling", 13. JVET Meeting; Jan. 9, 2019-Jan. 18, 2019; Marrakech; (The Joint Video Exploration Team of ISO/IEC JTC1/SC29/WG11 and ITU-T SG.16 ), No. JVET-M0146 Jan. 1, 2019 (Jan. 1, 2019 ), XP030200155, Retrieved from the Internet: URL:http://phenix.int-evry. fr/jvet/doc_end_user/documents/13_Marrakech/wg11 /JVET-M0146-v1.zip JVET-M0146-v1.docx [retrieved on Jan. 1, 2019].
Supplementary European Search Report in European application No. 19921790.2, mailed on Jun. 20, 2022.
English translation of the Written Opinion of the International Search Authority in the international application No. PCT/CN2019/113765, mailed on Jan. 31, 2020.
International Search Report in the international application No. PCT/CN2019/113765, mailed on Feb. 1, 2020.
Woo-Shik Kim et al: "Inter-plane prediction for RGB video coding", Image Processing, 2004. ICIP '04. 2004 International Conference On Singapore Oct. 24-27, 2004, Piscataway, NJ, USA, IEEE, vol. 2, Oct. 24, 2004 (Oct. 24, 2004), pp. 785-788, XP010785120, DOI: 10.1109/ICIP.2004.1419415, ISBN: 978-0-7803-8554-2.
First Office Action of the European application No. 19921790.2, issued on Mar. 2, 2023.
Xianguo Zhang et al., "Fast and Efficient Transcoding Based on Low-Complexity Background Modeling and Adaptive Block Classification", <IEEE transactions on multimedia>, vol. 15, No. 8, pp. 1769-1785, Aug. 29, 2013.
Notice of Allowance of the Chinese application No. 202111193882.4, issued on Apr. 14, 2023.
Hiroshi wakimori, masakazu sugiyama, takashi hanyu, "Machine learning in the cloud", First Edition, Jun. 23, 2015, pp. 109-111, Rick telecom, ISBN: 978-4-89797-992-2.
Second Office Action of the Japanese application No. 2024-112963, issued on Oct. 3, 2025.
Decision of Rejection of the Korean application No. 10-2021-7034571, issued on Oct. 27, 2025.

IMAGE COMPONENT PREDICTION METHOD, ENCODER, DECODER, AND STORAGE MEDIUM

CROSS-REFERENCE TO RELATED APPLICATIONS

This application is a continuation of U.S. application Ser. No. 17/480,865 filed on Sep. 21, 2021, which is a continuation application of International Application No. PCT/CN2019/113765 filed on Oct. 28, 2019, which claims priority to U.S. Provisional Application No. 62/823,609, filed on Mar. 25, 2019. The contents of the above applications are hereby incorporated by reference in their entireties.

TECHNICAL FIELD

Embodiments of the disclosure relate to the technical field of picture processing, and particularly to a method for predicting a colour component, an encoder, a decoder, and a storage medium.

BACKGROUND

Color information of a video picture is usually affected by factors such as color deviations of a light source and a collection device, resulting in the overall color to shift in a certain direction, i.e., cooler colors, photo yellowing, and other common phenomena. In order to offset such a color deviation in a whole video picture, an Illumination Compensation (IC) technology or a Local Illumination Compensation (LIC) technology is proposed at present, to implement color correction on the video picture.

Either the IC technology or the LIC technology needs to construct a prediction model, and then derives a prediction value of a video picture in video coding and decoding from the constructed prediction model. However, in a prediction model construction process, a relatively large number of samples are required to derive a model parameter, so the calculation complexity and memory bandwidth are high. In addition, these samples may include exceptional samples, so the prediction model is constructed not so accurately.

SUMMARY

The embodiments of the disclosure provide a method for predicting a colour component, an encoder, a decoder, and a storage medium. The number of pixels in a reference pixel set is reduced, so that not only are the calculation complexity and memory bandwidth reduced, but also the accuracy of a prediction model is improved, thereby improving the prediction accuracy of a colour component to be predicted and the prediction efficiency of a video picture.

The technical solutions of the embodiments of the disclosure may be implemented as follows.

According to a first aspect, the embodiments of the disclosure provide a method for predicting a colour component, which may include the following operations.

A first reference pixel set of a colour component to be predicted of a current block is determined.

A reference pixel subset is determined from the first reference pixel set. The reference pixel subset includes one or more candidate pixels selected from the first reference pixel set.

A model parameter of a prediction model is calculated using the reference pixel subset. The prediction model is configured to perform cross-component prediction processing on the colour component to be predicted of the current block.

According to a second aspect, the embodiments of the disclosure provide an encoder, which may include a first determination unit and a first calculation unit.

The first determination unit may be configured to determine a first reference pixel set of a colour component to be predicted of a current block.

The first determination unit may further be configured to determine a reference pixel subset from the first reference pixel set, the reference pixel subset including one or more candidate pixels selected from the first reference pixel set.

The first calculation unit may be configured to calculate a model parameter of a prediction model using the reference pixel subset, the prediction model being configured to perform cross-component prediction processing on the colour component to be predicted of the current block.

According to a third aspect, the embodiments of the disclosure provide an encoder, which may include a first memory and a first processor.

The first memory may be configured to store a computer program capable of running in the first processor.

The first processor may be configured to run the computer program to execute the method as described in the first aspect.

According to a fourth aspect, the embodiments of the disclosure provide a decoder, which may include a second determination unit and a second calculation unit.

The second determination unit may be configured to determine a first reference pixel set of a colour component to be predicted of a current block.

The second determination unit may further be configured to determine a reference pixel subset from the first reference pixel set, the reference pixel subset including one or more candidate pixels selected from the first reference pixel set.

The second calculation unit may be configured to calculate a model parameter of a prediction model using the reference pixel subset, the prediction model being configured to perform cross-component prediction processing on the colour component to be predicted of the current block.

According to a fifth aspect, the embodiments of the disclosure provide a decoder, which may include a second memory and a second processor.

The second memory may be configured to store a computer program capable of running in the second processor.

The second processor may be configured to run the computer program to execute the method as described in the first aspect.

According to a sixth aspect, the embodiments of the disclosure provide a computer storage medium, which may store a colour component prediction program. The colour component prediction program may be executed by a first processor or a second processor to implement the method as described in the first aspect.

The embodiments of the disclosure provide a method for predicting a colour component, an encoder, a decoder, and a storage medium. The first reference pixel set of the colour component to be predicted of the current block is determined, the reference pixel subset is determined from the first reference pixel set, the reference pixel subset including one or more candidate pixels selected from the first reference pixel set, and the model parameter of the prediction model is calculated using the reference pixel subset. The prediction model is configured to perform cross-component prediction processing on the colour component to be predicted of the current block. In this manner, since screening processing is performed on the first reference pixel set, unimportant reference pixels or exceptional reference pixels may be removed to further reduce the number of pixels in the first reference pixel set, so that not only may the calculation complexity and memory bandwidth be reduced, but also the accuracy of the prediction model may be improved. Since the prediction model is to implement prediction processing on the colour component to be predicted through the model parameter, the prediction accuracy of the colour component to be predicted is improved, and the prediction efficiency of a video picture is improved.

DETAILED DESCRIPTION

Figure 1:
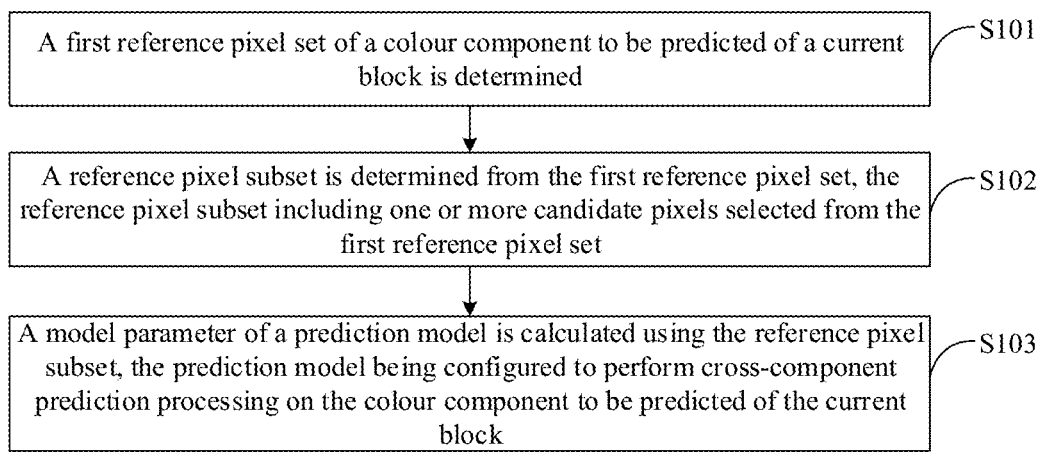
FIG. 1 is a schematic flowchart of a method for predicting a colour component according to an embodiment of the disclosure.

In order to make the characteristics and technical contents of the embodiments of the disclosure understood in more detail, implementation of the embodiments of the disclosure will be described below in combination with the drawings in detail. The appended drawings are only adopted for description as references and not intended to limit the embodiments of the disclosure.

In a video picture, a first colour component, a second colour component, and a third colour component are usually adopted to represent a Coding Block (CB). The three colour components are a luma component, a blue chroma component, and a red chroma component respectively. Specifically, the luma component is usually represented by a sign Y, the blue chroma component is usually represented by a sign Cb or U, and the red chroma component is usually represented by a sign Cr or V. Therefore, the video picture may be represented in a YCbCr format, and may also be represented in a YUV format.

In the embodiments of the disclosure, the first colour component may be the luma component, the second colour component may be the blue chroma component, and the third colour component may be the red chroma component. However, no specific limits are made in the embodiments of the disclosure.

In a present video picture or video encoding and decoding process, a cross-component prediction technology needs to construct a prediction model, an intra colour component prediction technology also needs to construct a prediction model. The cross-component prediction technology mainly includes a Cross-Component Linear Model Prediction (CCLM) mode and a Multi-Directional Linear Model Prediction (MDLM) mode. Prediction between colour components, for example, from the first colour component to the second colour component, from the second colour component to the first colour component, from the first colour component to the third colour component, from the third colour component to the first colour component, from the second colour component to the third colour component, or from the third colour component to the second colour component, may be implemented through prediction models constructed in the CCLM mode and the MDLM mode. The intra colour component prediction technology mainly includes a chroma component compensation technology and a luma component compensation technology, such as an IC technology and a LIC technology. Intra colour component prediction, such as prediction of the first colour component based on the first colour component, prediction of the second colour component based on the second colour component, or prediction of the third colour component based on the third colour component, may be implemented through a prediction model constructed by the intra colour component prediction technology. In the embodiments of the disclosure, the prediction model constructed by the intra colour component prediction technology will be mainly described below as an example.

In order to ensure accuracy of a model parameter used in a prediction model, a reference pixel set constructed to derive the model parameter is required to be more accurate. Based on this, the embodiments of the disclosure provide a method for predicting a colour component. A first reference pixel set of a colour component to be predicted of a current block is determined, a reference pixel subset is determined from the first reference pixel set, the reference pixel subset including one or more candidate pixels selected from the first reference pixel set, and a model parameter of a prediction model is calculated using the reference pixel subset, the prediction model being configured to perform cross-component prediction processing on the colour component to be predicted of the current block. In this manner, since screening processing is performed on the first reference pixel set, unimportant reference pixels or exceptional reference pixels may be removed to reduce the number of pixels in the first reference pixel set, so that not only may the calculation complexity and memory bandwidth be reduced, but also the accuracy of the prediction model may be improved, furthermore, prediction accuracy of the colour component to be predicted is improved, and prediction efficiency of a video picture is improved.

It is to be noted that the method for predicting a colour component of the embodiments of the disclosure may be applied to not only a video encoding system but also a video decoding system, and may even be applied to the video coding system and the video decoding system at the same time. No specific limits are made in the embodiments of the disclosure. It is also to be noted that, when the method is applied to the video encoding system, the "current block" specifically refers to a present CB in intra prediction, and when the method is applied to the video decoding system, the "current block" specifically refers to a present decoding block in intra prediction.

Each embodiment of the disclosure will be described below in combination with the drawings in detail.

FIG. 1 illustrates a schematic flowchart of a method for predicting a colour component according to an embodiment of the disclosure. The method may include the following operations.

In S101, a first reference pixel set of a colour component to be predicted of a current block is determined.

In S102, a reference pixel subset is determined from the first reference pixel set. The reference pixel subset includes one or more candidate pixels selected from the first reference pixel set.

In S103, a model parameter of a prediction model is calculated using the reference pixel subset. The prediction model is configured to perform cross-component prediction processing on the colour component to be predicted of the current block.

It is to be noted that a video picture may be divided into multiple picture blocks, and each picture block to be encoded currently may be called a current block. Each current block may include a first colour component, a second colour component, and a third colour component. The current block is a current block of which the first colour component, the second colour component, or the third colour component is presently to be predicted in the video picture. When the first colour component is required to be predicted through the prediction model, the colour component to be predicted is the first colour component. When the second colour component is required to be predicted through the prediction model, the colour component to be predicted is the second colour component. When the third colour component is required to be predicted through the prediction model, the colour component to be predicted is the third colour component.

It is also to be noted that the first reference pixel set is a reference pixel set corresponding to a prediction model constructed by a present related technical solution. There may be some unimportant reference pixels (for example, correlations of these reference pixels are relatively poor) or some exceptional reference pixels in the first reference pixel set. In order to ensure the accuracy of the prediction model, these reference pixels are required to be removed to obtain the reference pixel subset. According to the reference pixel subset, the accuracy of the prediction model may be ensured, so as to enable the prediction efficiency of the colour component to be predicted to be high.

In the embodiment of the disclosure, the first reference pixel set of the colour component to be predicted of the current block is determined at first, then the reference pixel subset is determined from the first reference pixel set, the reference pixel subset including one or more candidate pixels selected from the first reference pixel set, and the model parameter of the prediction model is calculated using the reference pixel subset, the prediction model being configured to perform cross-component prediction processing on the colour component to be predicted of the current block. In this manner, since screening processing is performed on the first reference pixel set, unimportant reference pixels or exceptional reference pixels may be removed to reduce the number of pixels in the first reference pixel set, so that not only may the calculation complexity and memory bandwidth be reduced, but also the accuracy of the prediction model may be improved, thereby further improving prediction accuracy of the colour component to be predicted and prediction efficiency of a video picture.

Furthermore, for determination of the first reference pixel set, the first reference pixel set may be obtained according to adjacent reference pixels around the current block, or may be obtained according to adjacent reference pixels in a reconstructed block. No specific limits are made in the embodiment of the disclosure. The two manners will be described below respectively.

In some embodiments, the operation in S101 that the first reference pixel set of the colour component to be predicted of the current block is determined may include the following actions.

Reference pixels adjacent to at least one side of the current block is acquired outside the current block. The at least one side of the current block includes at least one of a top side, a left side, a top-right side, or a bottom-left side.

The first reference pixel set is obtained according to the acquired reference pixels.

Figure 2A:
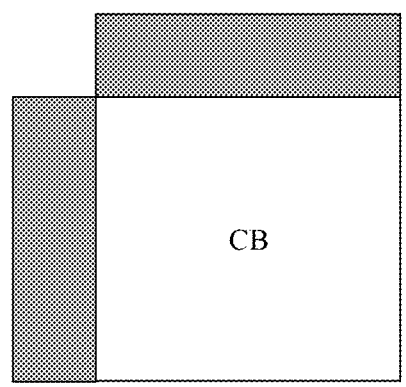
FIG. 2A is a schematic structure diagram of positions of reference pixels according to an embodiment of the disclosure.

Exemplarily, FIG. 2A illustrates a schematic structure diagram of positions of reference pixels according to an embodiment of the disclosure. In FIG. 2A, the reference pixels are around the current block, and namely are reference pixels adjacent to at least one side of the current block. The at least one side of the current block may refer to the left side of the current block, or may refer to the top side of the current block, or may even refer to the left side and top side of the current block. No specific limits are made in the embodiment of the disclosure.

It is to be understood that, if the at least one side of the current block is the left side and/or the top side, the operation in S101 that the first reference pixel set of the colour component to be predicted of the current block is determined may include the following actions.

The reference pixels adjacent to the at least one side of the current block are acquired. The at least one side includes the left side of the current block and/or the top side of the current block.

The first reference pixel set is obtained according to the acquired reference pixels.

It is to be noted that the at least one side of the current block may include the left side of the current block and/or the top side of the current block, namely the at least one side of the current block may refer to the top side of the current block, or may refer to the left side of the current block, or may even refer to the top side and left side of the current block. No specific limits are made in the embodiment of the disclosure.

Therefore, when a left-side neighbouring region and a top-side neighbouring region are available regions, the first reference pixel set may include reference pixels adjacent to the left side of the current block and reference pixels adjacent to the top side of the current block. When the left-side neighbouring region is available, and the top-side neighbouring region is unavailable, the first reference pixel set may include reference pixels adjacent to the left side of the current block. When the left-side neighbouring region is unavailable, and the top-side neighbouring region is available, the first reference pixel set may include reference pixels adjacent to the top side of the current block.

It is to be understood that, if the at least one side of the current block is an adjacent column formed by the left side and the bottom-left side, and/or an adjacent row formed by the top side and the top-right side, the operation in S101 that the first reference pixel set of the colour component to be predicted of the current block is determined may include the following actions.

Reference pixels in a reference row or reference column adjacent to the current block are acquired. The reference row is formed by rows adjacent to the top side and top-right side of the current block, and the reference column is formed by columns adjacent to the left side and bottom-left side of the current block.

The first reference pixel set is obtained according to the acquired reference pixels.

It is to be noted that the reference row adjacent to the current block may be formed by the rows adjacent to the top side and top-right side of the current block, and the reference column adjacent to the current block may be formed by the columns adjacent to the left side and bottom-left side of the current block. The reference row or reference column adjacent to the current block may refer to a reference row adjacent to the top side of the current block, or may refer to a reference column adjacent to the left side of the current block, or may even refer to a reference row or reference column adjacent to another side of the current block. No specific limits are made in the embodiment of the disclosure. For convenient description, in the embodiment of the disclosure, descriptions will be made taking the condition that the reference row adjacent to the current block is the reference row adjacent to the top side as an example, and descriptions will be made taking the condition that the reference column adjacent to the current block is the reference column adjacent to the left side as an example.

The reference pixels in the reference row adjacent to the current block may include reference pixels adjacent to the top side and the top-right side (also called adjacent reference pixels corresponding to the top side and the top-right side). The top side represents the top side of the current block, and the top-right side represents a side length that horizontally extends rightwards from the top side of the current block and is the same as a height of the current block. The reference pixels in the reference column adjacent to the current block may further include reference pixels adjacent to the left side and the bottom-left side (also called adjacent reference pixels corresponding to the left side and the bottom-left side). The left side represents the left side of the current block, and the bottom-left side represents a side length that vertically extends downwards from the left side of the current block and is the same as a width of the current decoding block. However, no specific limits are made in the embodiments of the disclosure.

Therefore, when the left-side neighbouring region and bottom-left-side neighbouring region are available regions, the first reference pixel set may include the reference pixels in the reference column adjacent to the current block. When the top-side neighbouring region and top-right-side neighbouring region are available regions, the first reference pixel set may include the reference pixels in the reference row adjacent to the current block.

In some embodiments, the operation in S101 that the first reference pixel set of the colour component to be predicted of the current block is determined may include the following actions.

Reference pixels adjacent to at least one side of a reconstructed block are acquired within the reconstructed block. The reconstructed block is a picture block that is adjacent to the current block and has been encoded and reconstructed, and the at least one side of the reconstructed block includes a bottom side, a right side, or the bottom side and the right side.

The first reference pixel set is obtained according to the acquired reference pixels.

Figure 2B:
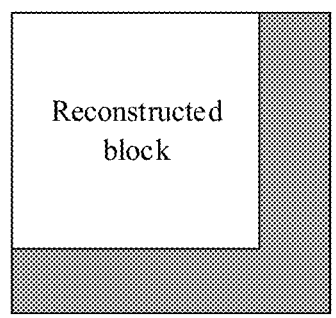
FIG. 2B is another schematic structure diagram of positions of reference pixels according to an embodiment of the disclosure.

Exemplarily, FIG. 2B illustrates a schematic structure diagram of positions of reference pixels according to an embodiment of the disclosure. In FIG. 2B, the reference pixels are in the reconstructed block, i.e., reference pixels adjacent to at least one side of the reconstructed block. The at least one side of the reconstructed block may refer to the right side of the reconstructed block, or may refer to the bottom side of the reconstructed block, or may even refer to the right side and bottom side of the reconstructed block. No specific limits are made in the embodiment of the disclosure.

It is to be noted that, from the perspective of construction of the prediction model, a reference pixel may be called a "pixel used for constructing the prediction model", the current block has been coded and reconstructed, the prediction model is constructed in this phase, and the prediction model may be conveniently used for other CBs in the subsequent picture. In addition, for the reconstructed block, on one hand, the first reference pixel set may be obtained using the adjacent reference pixels in the reconstructed block for subsequent construction of the prediction model of the current block. On the other hand, a prediction model corresponding to the reconstructed block may also be directly used as the prediction model of the current block. That is, for a current block under encoding, related information of a reconstructed block of a neighbouring region may be used by using a corresponding prediction model directly, without constructing the prediction model through adjacent reference pixels of the reconstructed block.

Furthermore, after the first reference pixel set is obtained, there may be some unimportant reference pixels (for example, correlations of these reference pixels are poor) or some exceptional reference pixels in the first reference pixel set. In order to ensure the accuracy of the model parameter derivation, these reference pixels are required to be removed to obtain the reference pixel subset. According to the reference pixel subset, the accuracy of the prediction model may be ensured, and the prediction efficiency of the colour component to be processed is high.

In some embodiments, the operation in S102 that the reference pixel subset is determined according to the first reference pixel set may include the following actions.

Candidate positions of the candidate pixels are determined based on the at least one side of the current block or the reconstructed block.

Reference pixels corresponding to the candidate positions are selected from the first reference pixel set, and the reference pixel subset is formed using the selected reference pixels.

Furthermore, the operation that the candidate positions of the candidate pixels are determined based on the at least one side of the current block or the reconstructed block may include the following action.

The candidate positions are determined based on pixel positions corresponding to the reference pixels adjacent to the at least one side.

Furthermore, the operation that the candidate positions of the candidate pixels are determined based on the at least one side of the current block or the reconstructed block may include the following action.

The candidate positions are determined based on colour component intensity values corresponding to the reference pixels adjacent to the at least one side.

Furthermore, the operation that the candidate positions of the candidate pixels are determined based on the at least one side of the current block or the reconstructed block may include the following action.

The candidate positions are determined based on pixel positions and colour component intensity values corresponding to the reference pixels adjacent to the at least one side.

It is to be noted that the colour component intensity may be represented by a colour component value, such as a luma value and a chroma value. If the colour component value is greater, it indicates that the colour component intensity is higher. In the embodiment of the disclosure, the selected reference pixels may be selected according to the candidate positions of the candidate pixels. A candidate position may be determined according to the pixel position, or may be determined according to the colour component intensity value (such as the luma value and the chroma value). No specific limits are made in the embodiment of the disclosure.

It is also to be noted that the reference pixel subset is obtained by performing screening processing on the first reference pixel set and then selecting part of reference pixels. The model parameter is calculated according to the reference pixel subset. In such case, the number of samples in the reference pixel subset is reduced, so that the number of samples required for calculation of the model parameter is reduced, thereby reducing the calculation complexity and memory bandwidth (also called a storage bandwidth).

It can be understood that, in the embodiment of disclosure, the selected part of reference pixels may be selected according to pixel positions corresponding to the reference pixels, or may be selected according to colour component intensity values (such as luma values and chroma values) corresponding to the reference pixels. No specific limits are made in the embodiment of the disclosure. No matter whether the first reference pixel set is screened according to the pixel positions corresponding to the reference pixels or the colour component intensity values corresponding to the reference pixels, proper reference pixels are selected to further form the reference pixel subset. In such case, the model parameter derived according to the reference pixel subset may be more accurate, and the prediction model constructed according to the model parameter may also be more accurate.

In some embodiments, the operation that the candidate positions of the candidate pixels are determined based on the at least one side of the current block or the reconstructed block may include the following actions.

A preset candidate pixel count is determined. The preset candidate pixel count represents the number of pixels sampled from the reference pixels adjacent to the at least one side.

The candidate positions are determined according to the preset candidate pixel count and a length of the at least one side. The length of the at least one side is equal to the number of pixels on the at least one side.

It is to be noted that, the related information of the reconstructed block may be used by using the corresponding prediction model directly, without the need of constructing the prediction model through the adjacent reference pixels of the reconstructed block. Therefore, in the embodiment of the disclosure, determination of the candidate positions of the candidate pixels will be described mainly taking the at least one side of the current block as an example.

It is also to be noted that the preset candidate pixel count represents the preset number of pixels to be sampled, i.e., the number of pixels in the reference pixel subset. Taking the pixel position as an example, after the preset candidate pixel count is determined, the candidate positions of the candidate pixels may be calculated according to the side length of the at least one side and the preset candidate pixel count, and then proper reference pixels are selected from the first reference pixel set according to the candidate positions to form the reference pixel subset. As such, the model parameter calculated according to the reference pixel subset is more accurate, the reconstructed prediction model may also be more accurate, thereby improving the prediction accuracy of the colour component to be predicted and the prediction efficiency of the video picture.

Furthermore, for determination of the candidate positions, a first sampling interval may be calculated at first, and then sampling processing is performed on the at least one side according to the first sampling interval to determine the candidate positions of the candidate pixels corresponding to the at least one side. Therefore, in some embodiments, the operation that the candidate positions of the candidate pixels are determined based on the at least one side of the current block or the reconstructed block may include the following actions.

A first sampling interval is calculated according to the preset candidate pixel count and the length of the at least one side.

A reference point is determined from the at least one side, and the candidate positions are determined according to the first sampling interval.

It is to be noted that the reference point may be a midpoint of the at least one side, or may be a first reference pixel position on the left of the midpoint of the at least one side, or may be a first reference pixel position on the right of the midpoint of the at least one side, or may even be another reference pixel position of the at least one side. No specific limits are made in the embodiment of the disclosure.

Specifically, the midpoint of the at least one side may be determined according to the length of the at least one side, and then the midpoint of the at least one side is determined as the reference point. The reference point may be the midpoint of the at least one side, or may be the first reference pixel position on the left of the midpoint of the at least one side, or may be the first reference pixel position on the right of the midpoint of the at least one side, or may even be another reference pixel position of the at least one side. No specific limits are made in the embodiment of the disclosure.

It is to be noted that, considering that the importance of the reference pixel adjacent to the at least one side of the current block is correlated with a corresponding position thereof, for making the reference pixel in the reference pixel subset representative of a characteristic of the whole adjacent side, it is necessary to select a reference pixel at a central position of the side as much as possible to remove a pixel with low importance (for example, reference pixels on two side edges of the side). In the embodiment of the disclosure, if descriptions are made taking the top side of the current block as an example, a first reference pixel position on the right or left of a middle position may be determined as a reference point of the side. If descriptions are made taking the left side of the current block as an example, a first reference pixel position lower or higher than a middle position may be determined as a reference point of the side.

In addition, before the reference point is determined, a preset number of reference pixels corresponding to an ending position of one side of the current block may be deleted at first, or initial offsetting is performed for the side from the ending position according to a preset offset, a new side is obtained by taking an offset reference pixel position as a starting point, and then a middle position corresponding to the new side is determined as the reference point. Correspondingly, a preset number of reference pixels corresponding to a starting position of one side of the current block may be deleted at first, or initial offsetting is performed for the side from the starting position according to the preset offset, a new side is obtained by taking an offset reference pixel position as a starting point, and then a middle position corresponding to the new side is determined as the reference point.

Figure 3:
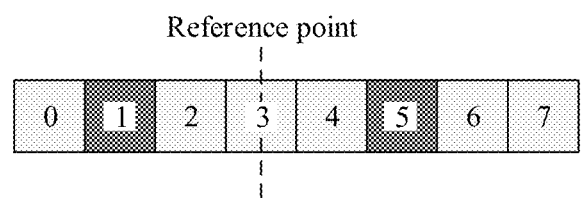
FIG. 3 is a schematic structure diagram of selecting a reference pixel subset adjacent to a top side of a current block according to an embodiment of the disclosure.
Figure 4:
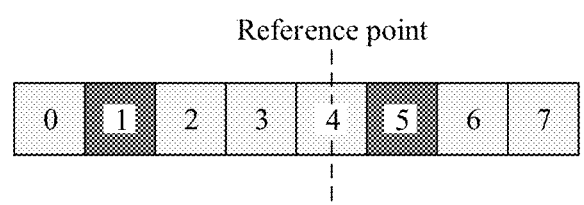
FIG. 4 is another schematic structure diagram of selecting a reference pixel subset adjacent to a top side of a current block according to an embodiment of the disclosure.

In practical applications, since a side length of the left side or top side of the current block is an integral multiple of 2, a middle position of the left side or top side of the current block is between two points. In the example illustrated in FIG. 3, the first pixel on the left of the middle position is determined as the midpoint of the side. However, in the embodiment of the disclosure, the first pixel on the right of the middle position may also be determined as the midpoint of the side, as illustrated in FIG. 4. In FIG. 3, the first pixel (for example, 3 in FIG. 3) on the left of the middle position is determined as the midpoint of the side. Since a preset sample count is 2, it may be determined that reference pixel positions to-be-selected (as illustrated by gray points in FIG. 3) are 1 and 5. Corresponding reference pixels may also be selected according to these reference pixel positions to form the reference pixel subset. Therefore, in the embodiment of the disclosure, for the top side of the current block, the first pixel on the right of the middle position may be determined as the midpoint of the side, or the first pixel on the left of the middle position may be determined as the midpoint of the side. No specific limits are made in the embodiment of the disclosure. In addition, for the left side of the current block, the first pixel lower than the middle position may be determined as the midpoint of the side, or the first pixel higher than the middle position may be determined as the midpoint of the side. No specific limits are made in the embodiment of the disclosure.

Unless otherwise specified, descriptions will be made below taking the top side of the current block as an example. However, the method for predicting a colour component in the embodiments of the disclosure is also applied to the left side of the current block, and even the right side of the reconstructed block or the bottom side of the reconstructed block. No specific limits are made in the embodiments of the disclosure.

It is to be understood that, without considering the existence of the reference pixel adjacent to the left side or top side of the current block, a second reference pixel set may further be constructed according to formula (1) and formula (2):

$$\Delta = \text{length}/(N_2/2). \quad (1)$$

$$\text{shift} = \Delta/2. \quad (2)$$

$\Delta$ represents the sampling interval, length represents the number of reference pixels in a row adjacent to the top side of the current block or the number of reference pixels in a column adjacent to the left side of the current block, $N_2$ represents the expected number (generally ½ for each of the left side and the top side, but no specific limits are made in the embodiment of the disclosure) of reference pixels, forming the reference pixel subset, of the current block, and shift represents a starting point position for selection of the reference pixels. When the middle position of the left side or top side of the current block is between two points, if the first pixel on the right of the middle position is determined as the midpoint of the side, the starting point position is shift=$\Delta/2$, and if the first pixel on the left of the middle position is determined as the midpoint of the side, the starting point position is shift=$\Delta/2-1$.

Exemplarily, taking the top side illustrated in FIG. 3 as an example, the length is equal to 8, and $N_2$ is equal to 4. If half of $N_2$ is for each of the left side and the top side, i.e., a preset sample count of the top side is 2, $\Delta=\text{length}/(N_2/2)=4$ and shift=$\Delta/2=2$ are calculated according to formula (1) and formula (2) respectively, namely the starting point position is 1, and the sampling interval is 4. The reference pixel positions to be selected, such as 1 and 5, may be determined at first, and then the corresponding reference pixels may be selected to form the reference pixel subset. It is to be noted that values of the preset sample count corresponding to the left side and the preset sample count corresponding to the top side may be the same or different. No specific limits are made in the embodiment of the disclosure.

It is also to be noted that, according to a preset candidate pixel count and a length of a side of the current block, a first sampling interval corresponding to the side may be calculated. In addition, since the side length of the left side or top side of the current block is an integral multiple of 2, the middle position of the left side or top side of the current block is between two points. In such case, a calculated midpoint value is a non-integer, and a calculated reference pixel position is also a non-integer. However, if the side length of the left side or top side of the current block is not an integral multiple of 2, the middle position of the left side or top side of the current block may not be between two points. In such case, the calculated midpoint value is an integer, and the calculated reference pixel position is also an integer. That is, the calculated midpoint value may be an integer and may also be a non-integer, and correspondingly, the calculated reference pixel position may be an integer and may also be a non-integer. No specific limits are made in the embodiment of the disclosure.

Therefore, when the calculated midpoint value is an integer, the calculated reference pixel position is correspondingly an integer, and in such case, the calculated reference pixel position may be directly determined as the candidate position. When the calculated midpoint is a non-integer, the calculated reference pixel position is correspondingly a non-integer, and in such case, the candidate position may be determined by rounding-up or rounding-down.

Furthermore, in some embodiments, after the first sampling interval is calculated, the method may further include the following operations.

The first sampling interval is adjusted to obtain a second sampling interval.

The candidate positions are determined based on the reference point and the second sampling interval.

It is to be noted that, after the first sampling interval is calculated, the first sampling interval may further be finely adjusted, for example, an operation of adding 1 or subtracting 1 is performed on the first sampling interval, to obtain the second sampling interval. For example, if the first sampling interval is 4, the second sampling interval obtained by adjustment may be 3 or 5. In the embodiment of the disclosure, adjustment of the first sampling interval may be slight (for example, adding 1 or subtracting 1), but a specific setting of adjustment amplitude is not specifically limited in the embodiment of the disclosure.

Furthermore, in some embodiments, after the second sampling interval is obtained, the method may further include the following operation.

Based on the reference point, a candidate position corresponding to one side of the reference point is determined according to the first sampling interval, and a candidate position corresponding to the other side of the reference point is determined according to the second sampling interval.

That is, after the reference point of the at least one side of the current block is determined, uniform sampling may be performed according to the first sampling interval or the second sampling interval, or nonuniform sampling may be performed according to the first sampling interval and the second sampling interval. Moreover, the candidate positions determined after the sampling may be distributed symmetrically on the two sides of the reference point, or may be distributed asymmetrically on the two sides of the reference point. No specific limits are made in the embodiment of the disclosure.

Furthermore, since the reference pixel at the middle position of the at least one side in the first reference pixel set is more relevant to the colour component to be predicted of the current block, continuous reference pixel positions, of which the number is equal to the preset sample count, nearby the middle position are determined as reference pixel positions to be selected. This method may be called a middle-position-based continuous point selection solution. Specifically, if reference pixel positions in a row/column adjacent to the top side or left side of the current block are numbered from 0, the number of the adjacent reference pixels in the formed reference pixel subset and corresponding reference pixel positions to be selected in the embodiment are illustrated in Table 1. In such case, the continuous reference pixel positions, of which the number is equal to the preset sample count, nearby the middle position may be determined as candidate positions, to form the reference pixel subset.

TABLE 1

| Side length of at least one side of the current block | Candidate position | Preset candidate pixel count |
| --- | --- | --- |
| 2 | 0, 1 | 2 |
| 4 | 1, 2 | 2 |
| 8 | 2, 3, 4 (or 3, 4, 5) | 3 |
| 16 | 6, 7, 8, 9 | 4 |
| 32 | 13, 14, 15, 16, 17, 18, 19, 20 | 8 |

Furthermore, for screening processing on the first reference pixel set, point skipping processing may also be performed on the reference pixels of the at least one side, namely unimportant reference pixels or exceptional reference pixels are skipped (which can also be understood as deletion processing), to obtain the reference pixel subset. Alternatively, based on this, i.e., after part of reference pixels of the at least one side are skipped, the second reference pixel set is obtained, and then screening processing is performed on the second reference pixel set to obtain the reference pixel subset. Therefore, in some embodiments, the operation that the candidate positions of the candidate pixels are determined based on the at least one side of the current block or the reconstructed block may include the following actions.

A preset number K of pixels to be skipped corresponding to the at least one side is determined, K being a positive integer more than or equal to 1.

Positions corresponding to K pixels to be skipped are determined from a starting position and/or ending position of the at least one side.

The K pixels to be skipped are continuously skipped from the starting position and/or ending position of the at least one side based on the positions corresponding to the K pixels to be skipped to obtain at least one new side.

The candidate positions are determined based on the at least one new side and the preset candidate pixel count.

It is to be noted that the preset number of pixels to be skipped represents the preset number of pixels to be deleted or skipped. In addition, the starting position of the at least one side represents a leftmost edge position of the top side of the current block or an uppermost edge position of the left side of the current block. The ending position of the at least one side represents a rightmost edge position of the top side of the current block or a bottommost edge position of the left side of the current block.

It is also to be noted that a value of K may be a preset reference pixel count, such as 1, 2, or 4, or may be calculated according to a side length of the current block and a corresponding preset ratio. However, in practical applications, K is still set according to a practical condition. No specific limits are made in the embodiment of the disclosure. A preset ratio corresponding to the top side of the current block may be represented by a first preset ratio, and a preset ratio corresponding to the left side of the current block may be represented by a second preset ratio. Values of the first preset ratio and the second preset ratio may be the same or different. No specific limits are made in the embodiment of the disclosure.

Therefore, in case of starting from the starting position of the at least one side, if the at least one side is the top side of the current block (which may also be called a reference row of the current block), positions corresponding to K pixels to be skipped may be determined from the leftmost edge position of the at least one side, and if the at least one side is the left side of the current block (which may also be called a reference column of the current block), positions corresponding to K pixels to be skipped may be determined from the uppermost edge position of the at least one side. In case of starting from the ending position of the at least one side, if the at least one side is the top side of the current block, positions corresponding to K pixels to be skipped may be determined from the rightmost edge position of the at least one side, and if the at least one side is the left side of the current block, positions corresponding to K pixels to be skipped may be determined from the bottommost edge position of the at least one side. In practical applications, settings are made according to the actual condition. No specific limits are made in the embodiment of the disclosure.

After the positions corresponding to the K pixels to be skipped are determined, in case of starting from the starting position of the at least one side, if the at least one side is the top side of the current block, positions corresponding to K continuous pixels to be skipped may be determined from the leftmost edge position of the top side to the right, and then the K pixels to be skipped are continuously skipped to obtain a new top side. In such case, candidate positions corresponding to the new top side may be determined according to a side length of the new top side and the preset candidate pixel count, and then selected candidate pixels form the reference pixel subset. If the at least one side is the left side of the current block, positions corresponding to K continuous pixels to be skipped may be determined from the uppermost edge position of the left side to the bottom, and then the K pixels to be skipped are continuously skipped to obtain a new left side. In such case, candidate positions corresponding to the new left side may be determined according to a side length of the new left side and the preset candidate pixel count, and then selected candidate pixels form the reference pixel subset. Alternatively, in case of starting from the ending position of the at least one side, if the at least one side is the top side of the current block, positions corresponding to K continuous pixels to be skipped may be determined from the rightmost edge position of the top side to the left, and then the K pixels to be skipped are continuously skipped to obtain a new top side. In such case, candidate positions corresponding to the new top side may be determined according to a side length of the new top side and the preset candidate pixel count, and then selected candidate pixels form the reference pixel subset. If the at least one side is the left side of the current block, positions corresponding to K continuous pixels to be skipped may be determined from the bottommost edge position of the left side to the top, and then the K pixels to be skipped are continuously skipped to obtain a new left side. In such case, candidate positions corresponding to the new left side may be determined according to a side length of the new left side and the preset candidate pixel count, and then selected candidate pixels form the reference pixel subset.

In the embodiment of the disclosure, a model parameter corresponding to a complex model (such as a nonlinear model or a multiple model) is derived using part of pixels (i.e., the reference pixel subset) in the first reference pixel set obtained by the adjacent reference pixels of the current block. Since the unimportant reference pixels or exceptional reference pixels have been removed from the obtained subset (i.e., the reference pixel subset), the number of the reference pixels is reduced, so that not only are the calculation complexity and the memory bandwidth reduced, but also the accuracy of the complex model is improved, thereby improving the prediction accuracy of the colour component to be processed and the prediction efficiency of the video picture.

Furthermore, after the reference pixel subset is determined, the model parameter of the prediction model may be calculated according to the reference pixel subset to construct the prediction model. Therefore, in some embodiments, the operation in S103 that the model parameter of the prediction model is calculated using the reference pixel subset may include the following actions.

An neighboring pixel reconstructed value of a colour component to be predicted corresponding to the current block and an neighboring pixel reconstructed value of a colour component to be predicted corresponding to a reference block are acquired based on the reference pixel subset. The current block is in an Nth video picture, and the reference block is in an (N−1)th video picture.

The model parameter is calculated according to the neighboring pixel reconstructed value of the colour component to be predicted corresponding to the current block and the neighboring pixel reconstructed value of the colour component to be predicted corresponding to the reference block.

It is to be noted that the reference block and the current block are not in the same frame, and they are in an inter-frame relationship. The reference block and the current block are in different frames of video pictures, and the frame where the reference block is located is a previous frame of the frame where the current block is located, namely the current block is in the Nth video picture, and the reference block is in the (N−1)th video picture. In addition, there may be a motion vector (MV) offset between a position of the current block in the Nth video picture and a position of the reference block in the (N−1)th video picture.

In addition, the model parameter includes a first model parameter $\alpha$ and a second model parameter $\beta$. $\alpha$ and $\beta$ may be calculated in many manners. A preset factor calculation model constructed by a least square method may be used, or a preset factor calculation model constructed by a maximum and a minimum may be used, or a preset factor calculation model constructed in another manner may even be used. No specific limits are made in the embodiment of the disclosure.

Taking the preset factor calculation model constructed by the least square method as an example, if the prediction model is mainly configured to perform prediction processing, such as the IC technology or LIC technology, on a luma component, $\alpha$ and $\beta$ may be derived by minimizing a regression error through luma component neighboring pixel reconstructed values corresponding to the current block and luma component neighboring pixel reconstructed values corresponding to the reference block. Specifically, the preset factor calculation model is illustrated as formula (3):

$$\begin{cases} \alpha = \dfrac{2N \cdot \sum (L(n) \cdot C(n)) - \sum L(n) \cdot \sum C(n)}{2N \cdot \sum (L(n) \cdot L(n)) - \sum L(n) \cdot \sum L(n)} \\ \beta = \dfrac{\sum C(n) - \alpha \cdot \sum L(n)}{2N} \end{cases} \quad (3)$$

L(n) represents a luma component neighboring pixel reconstructed value corresponding to the reference block, C(n) represents a luma component neighboring pixel reconstructed value corresponding to the current block, N is the number of neighboring pixels of the luma component corresponding to the current block, n=1, 2, . . . , 2N. As such, the first model parameter $\alpha$ and the second model parameter $\beta$ may be calculated through formula (3).

Taking the preset factor calculation model constructed by the maximum and the minimum as an example, a simplified model parameter derivation method is provided. Specifically, the luma component neighboring pixel reconstructed values corresponding to the reference block may be searched for a maximum and a minimum, and $\alpha$ and $\beta$ are derived according to the principle "two points define a line". The preset factor calculation model is illustrated as formula (4):

$$\begin{cases} \alpha = \dfrac{L_{max} - L_{min}}{C_{max} - C_{min}} \\ \beta = L_{min} - \alpha \cdot C_{min} \end{cases} \quad (4)$$

$L_{max}$ and $L_{min}$ represent the maximum and minimum searched from luma component neighboring pixel reconstructed values corresponding to the reference block, and $C_{max}$ and $C_{min}$ represent luma component neighboring pixel reconstructed values corresponding to reference pixels at positions corresponding to $L_{max}$ and $L_{min}$ in the luma component neighboring pixel reconstructed values corresponding to the current block. The first model parameter $\alpha$ and the second model parameter $\beta$ may also be calculated through formula (4) according to $L_{max}$, $L_{min}$, $C_{max}$, and $C_{min}$.

After the first model parameter $\alpha$ and the second model parameter $\beta$ are obtained, the prediction model may be constructed. Specifically, based on $\alpha$ and $\beta$, if a luma component prediction value corresponding to the current block is predicted according to a luma component prediction value corresponding to the reference block, the prediction model constructed may be illustrated as formula (5):

$$Pred^1[i, j] = \alpha \cdot Pred[i, j] + \beta. \quad (5)$$

i, j represents a position coordinate of a pixel in the current block, i represents a horizontal direction, and/represents a vertical direction, $\operatorname{Pred}^1[i, j]$ represents a luma component prediction value corresponding to the pixel with the position coordinate [i, j] in the current block, and Pred[i, j] represents a luma component prediction value corresponding to the pixel with the position coordinate [i, j] in the reference block.

Figure 5:
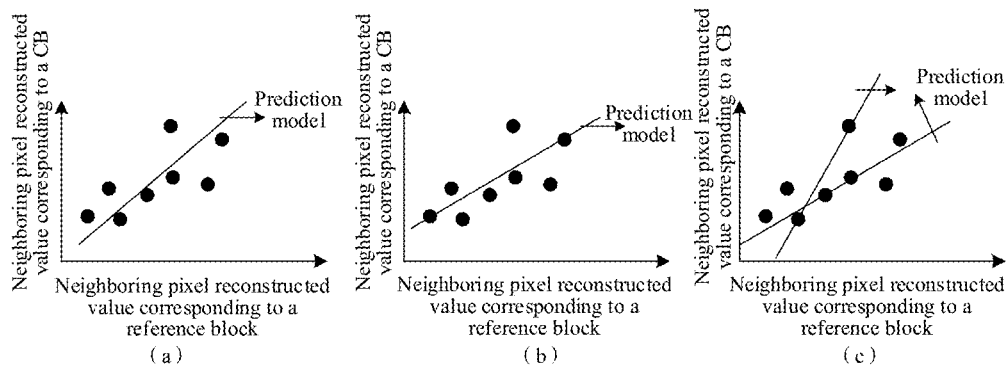
FIG. 5 is a comparison structure diagram of a prediction model according to an embodiment of the disclosure.

It is also to be noted that, in the embodiments of the disclosure, the prediction model may be a linear model, or may be a nonlinear model. The nonlinear model may be a nonlinear form such as a quadratic curve, or may be a nonlinear form formed by multiple linear models. The cross-component prediction technology in the Multiple Model CCLM (MMLM) is a nonlinear form formed by multiple linear models. Referring to FIG. 5, a comparison structure diagram of a prediction model according to an embodiment of the disclosure is illustrated. In FIG. 5, (a) represents that the prediction model is a linear model, which is derived according to all reference pixels in the second reference pixel set, (b) represents that the prediction model is also a linear model, which is derived according to a maximum and minimum in the second reference pixel set, and (c) represents that the prediction model is a nonlinear model, which is a nonlinear model example formed by two linear models. It is to be noted that, in the embodiments of the disclosure, descriptions will be made taking the condition that the prediction model is a linear model as an example, but the method for predicting a colour component in the embodiments of the disclosure may also be applied to a nonlinear model.

It is also to be noted that, in the embodiments of the disclosure, the prediction model may be configured not only to perform prediction processing on the luma component but also to perform prediction processing on a chroma component. Moreover, a prediction value of the colour component to be predicted (such as the luma component or the chroma component) may be updated through the prediction model to make colour component prediction more accurate and achieve the purpose of improving the prediction accuracy of the colour component to be predicted and the prediction efficiency of the video picture.

Furthermore, in some embodiments, after the operation that the model parameter of the prediction model is calculated using the reference pixel subset, the method may further include the following operations.

The prediction model is constructed according to the model parameter.

Prediction processing is performed on the colour component to be predicted of the current block through the prediction model to obtain a prediction value corresponding to the colour component to be predicted.

It is to be noted that, after the prediction model is constructed, prediction processing may be performed on the colour component to be predicted according to the prediction model. In one aspect, a first colour component of the current block may be predicted using a first colour component of the reference block. For example, the luma component of the current block is predicted using the luma component of the reference block to update a prediction value of the luma component. In another aspect, a second colour component of the current block may be predicted using a second colour component of the reference block. For example, the blue chroma component of the current block is predicted using the blue chroma component of the reference block to update a prediction value of the blue chroma component. In a third aspect, a third colour component of the current block may be predicted using a third colour component of the reference block. For example, the red chroma component of the current block is predicted using the red chroma component of the reference block to update a prediction value of the red chroma component. No specific limits are made in the embodiment of the disclosure.

The embodiment provides a method for predicting a colour component. The first reference pixel set of the colour component to be predicted of the current block is determined, the reference pixel subset is determined from the first reference pixel set, the reference pixel subset including one or more candidate pixels selected from the first reference pixel set, and the model parameter of the prediction model is calculated using the reference pixel subset, the prediction model being configured to perform cross-component prediction processing on the colour component to be predicted of the current block. In this manner, since screening processing is performed on the first reference pixel set, unimportant reference pixels or exceptional reference pixels may be removed to reduce the number of pixels in the first reference pixel set, so that not only may the calculation complexity and memory bandwidth be reduced, but also the accuracy of the prediction model may be improved. Since the prediction model is to implement prediction processing on the colour component to be predicted through the model parameter, prediction accuracy of the colour component to be predicted is improved, and prediction efficiency of the video picture is improved.

Figure 6:
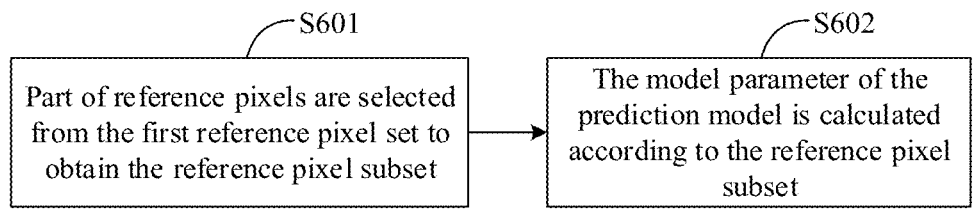
FIG. 6 is a schematic flowchart of another method for predicting a colour component according to an embodiment of the disclosure.

Referring to FIG. 6, a schematic flowchart of another method for predicting a colour component according to an embodiment of the disclosure is illustrated. As illustrated in FIG. 6, the method may include the following operations.

In S601, part of reference pixels are selected from the first reference pixel set to obtain the reference pixel subset.

In S602, the model parameter of the prediction model is calculated according to the reference pixel subset.

It is to be noted that the reference pixel subset is obtained by selecting part of reference pixels from the first reference pixel set. The model parameter is calculated according to the reference pixel subset. In such case, the number of samples in the reference pixel subset is reduced, so that the number of samples required for calculation of the model parameter is reduced, thereby reducing the calculation complexity and the memory bandwidth (also called a storage bandwidth).

In some embodiments, the operation that the first reference pixel set of the colour component to be predicted of the current block is determined may include the following action.

One or more first neighboring pixels of the current block are determined as the first reference pixel set. The first neighboring pixel is a pixel adjacent to a vertical side of the current block, a horizontal side of the current block, or the vertical side and horizontal side of the current block.

Furthermore, in some embodiments, the method may further include the following operation.

When the first neighboring pixel is outside the current block, it is determined that the vertical side of the current block is a column adjacent to the left outside the current block and the horizontal side of the current block is a row adjacent to the top outside the current block.

Furthermore, in some embodiments, the method may further include the following operation.

When the first neighboring pixel is in the current block, it is determined that the vertical side of the current block is a right-side column in the current block and the horizontal side of the current block is a bottom-side row in the current block.

It is to be noted that, when the first neighboring pixel is outside the current block, the vertical side of the current block may be considered as the left side of the current block, and the horizontal side of the current block may be considered as the top side of the current block; and when the first neighboring pixel is in the current block, the vertical side of the current block may be considered as the right side of the current block, and the horizontal side of the current block may be considered as the bottom side of the current block.

Therefore, after the one or more first neighboring pixels of the current block are obtained, the first reference pixel set may be formed. There may be some unimportant reference pixels (for example, correlations of these reference pixels are poor) or some exceptional reference pixels in the first reference pixel set. In order to ensure the derivation accuracy of the model parameter, these reference pixels are required to be removed to obtain the reference pixel subset. Therefore, in some embodiments, the operation that the reference pixel subset is determined may include the following actions.

The candidate positions of the candidate pixels are determined on a side of the current block, the side of the current block being the vertical side or horizontal side of the current block.

Pixels at the candidate positions are selected from the first reference pixel set, and the reference pixel subset is formed using the selected pixels.

Furthermore, the operation that the candidate positions of the candidate pixels are determined may include the following action.

The candidate positions of the candidate pixels are determined according to positions of the pixels in the first reference pixel set.

Furthermore, the operation that the candidate positions of the candidate pixels are determined may include the following action.

The candidate positions of the candidate pixels are determined according to colour component intensities of the pixels in the first reference pixel set.

Furthermore, the operation that the candidate positions of the candidate pixels are determined may include the following action.

The candidate positions of the candidate pixels are determined according to positions and colour component intensities of the pixels in the first reference pixel set.

It is to be noted that the colour component intensity may be represented by a colour component value, such as a luma value and a chroma value. If the colour component value is greater, it indicates that the colour component intensity is higher. In the embodiment of the disclosure, the selected reference pixels may be selected according to the candidate positions of the candidate pixels. Each candidate position may be determined according to the pixel position, or may be determined according to the colour component intensity value (such as the luma value and the chroma value). No specific limits are made in the embodiment of the disclosure.

It is also to be noted that the reference pixel subset is obtained by performing screening processing on the first reference pixel set and then selecting part of reference pixels. The model parameter is calculated according to the reference pixel subset. In such case, the number of samples in the reference pixel subset is reduced, so that the number of samples required for calculation of the model parameter is reduced, thereby reducing the calculation complexity and memory bandwidth (also called a storage bandwidth).

It can be understood that, in the embodiment of disclosure, the selected part of reference pixels may be selected according to pixel positions corresponding to the reference pixels, or may be selected according to colour component intensity values (such as luma values and chroma values) corresponding to the reference pixels. No specific limits are made in the embodiment of the disclosure. No matter whether the first reference pixel set is screened according to the pixel positions corresponding to the reference pixels or the colour component intensity values corresponding to the reference pixels, proper reference pixels are selected to form the reference pixel subset. In such case, the model parameter derived according to the reference pixel subset may be more accurate, and the prediction model constructed according to the model parameter may also be more accurate.

In some embodiments, the operation that the candidate positions of the candidate pixels are determined may include the following actions.

A preset candidate pixel count is determined. The preset candidate pixel count indicates the number of pixels selected from the side of the current block.

The candidate positions of the candidate pixels are determined according to the first preset pixel count and a length of the side of the current block. The length of the side of the current block is equal to the number of reference pixels on the side of the current block in the first reference pixel set.

It is to be noted that the preset candidate pixel count represents the preset number of pixels to be sampled, i.e., the number of the pixels in the reference pixel subset. Taking the pixel position as an example, after the preset candidate pixel count is determined, the candidate positions of the candidate pixels may be calculated according to the side length of the at least one side and the preset candidate pixel count, and then proper reference pixels are selected from the first reference pixel set according to the candidate positions to form the reference pixel subset. As such, the model parameter calculated according to the reference pixel subset is more accurate, the reconstructed prediction model may also be more accurate, thereby improving the prediction accuracy of the colour component to be predicted and the prediction efficiency of the video picture.

Furthermore, for determination of the candidate positions, the first sampling interval may be calculated at first, and then sampling processing is performed on the at least one side according to the first sampling interval to determine the candidate positions of the candidate pixels corresponding to the at least one side. Therefore, in some embodiments, the operation that the candidate positions of the candidate pixels are determined may include the following action.

The first sampling interval is calculated according to the length of the side of the current block and the preset candidate pixel count.

Furthermore, the operation that the candidate positions of the candidate pixels are determined may include the following action.

The first sampling interval is adjusted to obtain a second sampling interval.

It is to be noted that, after the first sampling interval is calculated, the first sampling interval may further be finely adjusted, for example, an operation of adding 1 or subtracting 1 is performed on the first sampling interval, to obtain the second sampling interval. For example, if the first sampling interval is 4, the second sampling interval obtained by adjustment may be 3 or 5. In the embodiment of the disclosure, adjustment of the first sampling interval may be slight (for example, adding 1 or subtracting 1), but a specific setting of adjustment amplitude is not specifically limited in the embodiment of the disclosure.

In some embodiments, after the first sampling interval is calculated, the method may further include the following operation.

A reference point is determined on the side of the current block, and the candidate positions on the side of the current block are determined according to the first sampling interval from the reference point.

Furthermore, after the first sampling interval is calculated, the method may further include the following operation.

A reference point is determined on the side of the current block, and candidate positions on two sides of the reference point are determined according to the first sampling interval.

In some embodiments, after the second sampling interval is obtained, the method may further include the following operation.

A reference point is determined on the side of the current block, and the candidate positions on the side of the current block are determined according to the second sampling interval from the reference point.

Furthermore, after the second sampling interval is obtained, the method may further include the following operation.

A reference point is determined on the side of the current block, and the candidate positions on the two sides of the reference point are determined according to the second sampling interval.

It is to be noted that the reference point may be the midpoint of the at least one side, or may be the first reference pixel position on the left of the midpoint of the at least one side, or may be the first reference pixel position on the right of the midpoint of the at least one side, or may even be another reference pixel position on the at least one side. No specific limits are made in the embodiment of the disclosure.

Specifically, the midpoint of the at least one side may be determined according to the length of the at least one side, and then the midpoint of the at least one side is determined as the reference point. The reference point may be the midpoint of the at least one side, or may be the first reference pixel position on the left of the midpoint of the at least one side, or may be the first reference pixel position on the right of the midpoint of the at least one side, or may even be another reference pixel position of the at least one side. No specific limits are made in the embodiment of the disclosure.

Furthermore, in some embodiments, after the second sampling interval is obtained, the method may further include the following operation.

A reference point is determined on the side of the current block, a candidate position corresponding to one side of the reference point is determined according to the first sampling interval, and a candidate position corresponding to the other side of the reference point is determined according to the second sampling interval.

That is, after the reference point of the at least one side of the current block is determined, uniform sampling may be performed according to the first sampling interval or the second sampling interval, or nonuniform sampling may be performed according to the first sampling interval and the second sampling interval. Moreover, the candidate positions determined after sampling may be distributed symmetrically on the two sides of the reference point, or may be distributed asymmetrically on the two sides of the reference point. No specific limits are made in the embodiment of the disclosure.

Furthermore, for selection processing on the first reference pixel set, point skipping processing may also be performed on the reference pixels of the at least one side, namely unimportant reference pixels or exceptional reference pixels are skipped (which can also be understood as deletion processing), to obtain the reference pixel subset. Alternatively, based on this, i.e., after part of reference pixels of the at least one side are skipped, the second reference pixel set is obtained, and then screening processing is performed on the second reference pixel set to obtain the reference pixel subset. Therefore, the method may further include the following operations.

A preset number K of pixels to be skipped of the side of the current block is determined, K being a nonnegative integer.

A Kth pixel position from an end position of the side of the current block is set as the reference point.

The end position of the side of the current block is a starting pixel position or ending pixel position of the side of the current block.

It is to be noted that the preset number of pixels to be skipped represents the preset number of pixels to be deleted or skipped. In addition, the starting position of the at least one side represents a leftmost edge position of the top side of the current block or an uppermost edge position of the left side of the current block. The ending position of the at least one side represents a rightmost edge position of the top side of the current block or a bottommost edge position of the left side of the current block.

It is also to be noted that a value of K may be a preset reference pixel count, such as 1, 2, or 4, or may be calculated according to a side length of the current block and a corresponding preset ratio. However, in practical applications, K is still set according to a practical condition. No specific limits are made in the embodiment of the disclosure. A preset ratio corresponding to the top side of the current block may be represented by a first preset ratio, and a preset ratio corresponding to the left side of the current block may be represented by a second preset ratio. Values of the first preset ratio and the second preset ratio may be the same or different. No specific limits are made in the embodiment of the disclosure.

After the reference pixel subset is determined, the model parameter of the prediction model may be calculated according to the reference pixel subset to construct the prediction model. Therefore, in some embodiments, the operation that the model parameter of the prediction model is calculated using the reference pixel subset may include the following action.

The model parameter of the prediction model is calculated using a reference pixel in the reference pixel subset and a pixel, at the same position of the reference pixel in the reference pixel subset, in a reference block of the current block.

The pixel at the same position of the reference pixel in the reference pixel subset is a pixel, of which a position relative to the reference block is the same as a position of a reference pixel in the second reference pixel set relative to the current block, in an image where the reference block is located.

Furthermore, after the model parameter of the prediction model is calculated, the method may further include the following operation.

A prediction value of the colour component to be predicted of the current block is calculated according to the prediction model and the reference block of the current block.

It is to be noted that the reference block may be a picture block indicated by an inter prediction parameter of the current block. As such, after the model parameter (such as the first model parameter $\alpha$ and the second model parameter $\beta$) is calculated, the prediction model may be constructed, as illustrated in above formula (5). The prediction value of the colour component to be predicted of the current block may further be calculated according to the prediction model and the reference block of the current block.

In addition, in the embodiments of the disclosure, when the method for predicting a colour component is applied to an encoder side, part of pixels may be selected from the first reference pixel set of the current block to form the reference pixel subset, then the model parameter of the prediction model is calculated according to the reference pixel subset, and the calculated model parameter is signaled in a bitstream. The bitstream is transmitted to a decoder side by the encoder side. Correspondingly, when the method for predicting a colour component is applied to the decoder side, the bitstream may be parsed to directly obtain the model parameter of the prediction model. Alternatively, on the decoder side, part of pixels may be selected from the first reference pixel set of the current block to form the reference pixel subset, then the model parameter of the prediction model is calculated according to the reference pixel subset to construct the prediction model, and cross-component prediction processing is performed on at least one colour component of the current block using the prediction model.

The embodiment provides a method for predicting a colour component, to elaborate specific implementation of the abovementioned embodiments. It can be seen from the technical solution of the abovementioned embodiments that screening processing is performed on the first reference pixel set to remove the unimportant reference pixels or the exceptional reference pixels, so that the number of pixels in the first reference pixel set is reduced, not only may the calculation complexity and the memory bandwidth be reduced, but also the accuracy of the prediction model may be improved. Since the prediction model is to implement prediction processing on the colour component to be predicted through the model parameter, the prediction accuracy of the colour component to be predicted is improved, and the prediction efficiency of the video picture is improved.

Figure 7:
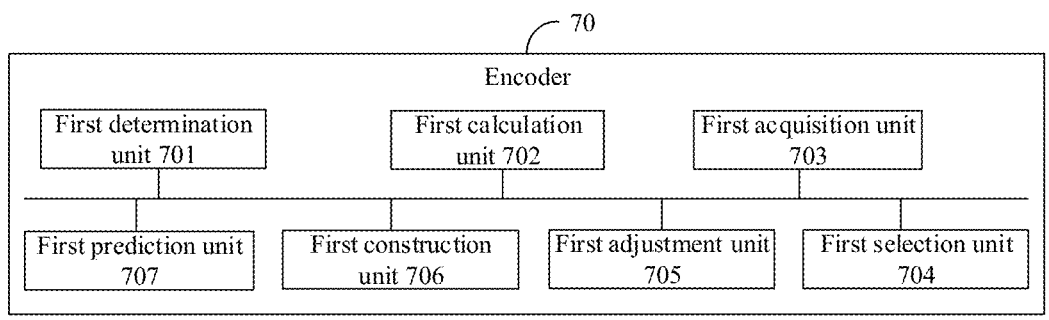
FIG. 7 is a composition structure diagram of an encoder according to an embodiment of the disclosure.

Based on the same inventive concept of the abovementioned embodiments, FIG. 7 illustrates a composition structure diagram of an encoder 70 according to an embodiment of the disclosure. As illustrated in FIG. 7, the encoder 70 may include a first determination unit 701 and a first calculation unit 702.

The first determination unit 701 is configured to determine a first reference pixel set of a colour component to be predicted of a current block.

The first determination unit 701 is further configured to determine a reference pixel subset from the first reference pixel set. The reference pixel subset includes one or more candidate pixels selected from the first reference pixel set.

The first calculation unit 702 is configured to calculate a model parameter of a prediction model using the reference pixel subset. The prediction model is configured to perform cross-component prediction processing on the colour component to be predicted of the current block.

In the solution, referring to FIG. 7, the encoder 70 may further include a first acquisition unit 703, configured to acquire reference pixels adjacent to at least one side of the current block outside the current block, the at least one side of the current block including at least one of a top side, a left side, a top-right side, or a bottom-left side, and obtain the first reference pixel set according to the acquired reference pixels.

In the solution, the first acquisition unit 703 is further configured to acquire reference pixels adjacent to at least one side of a reconstructed block within the reconstructed block, the reconstructed block being a picture block that is adjacent to the current block and has been encoded and reconstructed, and the at least one side of the reconstructed block including a bottom side, a right side, or the bottom side and the right side, and obtain the first reference pixel set according to the acquired reference pixels.

In the solution, referring to FIG. 7, the encoder 70 may further include a first selection unit 704.

The first determination unit 701 is further configured to determine candidate positions of the candidate pixels based on the at least one side of the current block or the reconstructed block.

The first selection unit 704 is configured to select reference pixels corresponding to the candidate positions from the first reference pixel set, and form the reference pixel subset using the selected reference pixels.

In the solution, the first determination unit 701 is further configured to determine the candidate positions based on pixel positions corresponding to the reference pixels adjacent to the at least one side.

In the solution, the first determination unit 701 is further configured to determine the candidate positions based on colour component intensity values corresponding to the reference pixels adjacent to the at least one side.

In the solution, the first determination unit 701 is further configured to determine the candidate positions based on pixel positions and colour component intensity values corresponding to the reference pixels adjacent to the at least one side.

In the solution, the first determination unit 701 is further configured to determine a preset candidate pixel count, the preset candidate pixel count representing the number of pixels sampled from the reference pixels adjacent to the at least one side, and determine the candidate positions according to the preset candidate pixel count and a length of the at least one side. The length of the at least one side is equal to the number of pixels on the at least one side.

In the solution, the first calculation unit 702 is further configured to calculate a first sampling interval according to the preset candidate pixel count and the length of the at least one side.

The first determination unit 701 is further configured to determine a reference point from the at least one side and determine the candidate positions according to the first sampling interval.

In the solution, referring to FIG. 7, the encoder 70 may further include a first adjustment unit 705, configured to adjust the first sampling interval to obtain a second sampling interval.

The first determination unit 701 is further configured to determine the candidate positions based on the reference point and the second sampling interval.

In the solution, the first determination unit 701 is further configured to, based on the reference point, determine a candidate position corresponding to one side of the reference point according to the first sampling interval, and determine a candidate position corresponding to the other side of the reference point according to the second sampling interval.

In the solution, the first determination unit 701 is further configured to determine a preset number K of pixels to be skipped corresponding to the at least one side, K being a positive integer more than or equal to 1, determine positions corresponding to K pixels to be skipped from a starting position and/or ending position of the at least one side, continuously skip the K pixels to be skipped from the starting position and/or ending position of the at least one side based on the positions corresponding to the K pixels to be skipped to obtain at least one new side, and determine the candidate positions based on the at least one new side and the preset candidate pixel count.

In the solution, the first selection unit 704 is further configured to acquire a neighboring pixel reconstructed value of a colour component to be predicted corresponding to the current block and a neighboring pixel reconstructed value of a colour component to be predicted corresponding to a reference block based on the reference pixel subset. The current block is in an Nth video picture, and the reference block is in an (N−1)th video picture.

The first calculation unit 702 is further configured to calculate the model parameter according to the neighboring pixel reconstructed value of the colour component to be predicted corresponding to the current block and the neighboring pixel reconstructed value of the colour component to be predicted corresponding to the reference block.

In the solution, referring to FIG. 7, the encoder 70 may further include a first construction unit 706 and a first prediction unit 707.

The first construction unit 706 is configured to construct the prediction model according to the model parameter.

The first prediction unit 707 is configured to perform prediction processing on the colour component to be predicted of the current block through the prediction model to obtain a prediction value corresponding to the colour component to be predicted.

In the solution, the first determination unit 701 is further configured to determine one or more first neighboring pixels of the current block as the first reference pixel set. The first neighboring pixel is a pixel adjacent to a vertical side of the current block, a horizontal side of the current block, or the vertical side and horizontal side of the current block.

In the solution, the first determination unit 701 is further configured to, when the first neighboring pixel is outside the current block, determine that the vertical side of the current block is a column adjacent to the left outside the current block and the horizontal side of the current block is a row adjacent to the top outside the current block.

In the solution, the first determination unit 701 is further configured to, when the first neighboring pixel is in the current block, determine that the vertical side of the current block is a right-side column in the current block and the horizontal side of the current block is a bottom-side row in the current block.

In the solution, the first determination unit 701 is further configured to determine the candidate positions of the candidate pixels on a side of the current block, the side of the current block being the vertical side or horizontal side of the current block, select pixels at the candidate positions from the first reference pixel set, and form the reference pixel subset using the selected pixels.

In the solution, the first determination unit 701 is further configured to determine the candidate positions of the candidate pixels according to positions of the pixels in the first reference pixel set.

In the solution, the first determination unit 701 is further configured to determine the candidate positions of the candidate pixels according to colour component intensities of the pixels in the first reference pixel set.

In the solution, the first determination unit 701 is further configured to determine the candidate positions of the candidate pixels according to positions and colour component intensities of the pixels in the first reference pixel set.

In the solution, the first determination unit 701 is further configured to determine a preset candidate pixel count, the preset candidate pixel count indicating the number of pixels selected from the side of the current block, and determine the candidate positions of the candidate pixels according to the first preset pixel count and a length of the side of the current block. The length of the side of the current block is equal to the number of reference pixels on the side of the current block in the first reference pixel set.

In the solution, the first calculation unit 702 is further configured to calculate a first sampling interval according to the length of the side of the current block and the preset candidate pixel count.

In the solution, the first adjustment unit 705 is configured to adjust the first sampling interval to obtain a second sampling interval.

In the solution, the first determination unit 701 is further configured to determine a reference point on the side of the current block, and determine the candidate positions on the side of the current block according to the first sampling interval from the reference point.

In the solution, the first determination unit 701 is further configured to determine a reference point on the side of the current block, and determine candidate positions on two sides of the reference point according to the first sampling interval.

In the solution, the first determination unit 701 is further configured to determine a reference point on the side of the current block and determine the candidate positions on the side of the current block according to the second sampling interval from the reference point.

In the solution, the first determination unit 701 is further configured to determine a reference point on the side of the current block and determine the candidate positions on the two sides of the reference point according to the second sampling interval.

In the solution, the first determination unit 701 is further configured to determine a reference point on the side of the current block, determine a candidate position corresponding to one side of the reference point according to the first sampling interval, and determine a candidate position corresponding to the other side of the reference point according to the second sampling interval.

In the solution, the first determination unit 701 is further configured to determine a preset number K of pixels to be skipped of the side of the current block, K being a nonnegative integer, and set a Kth pixel position from an end position of the side of the current block as the reference point. The end position of the side of the current block is a starting pixel position or ending pixel position of the side of the current block.

In the solution, the first calculation unit 702 is further configured to calculate the model parameter of the prediction model using a reference pixel in the reference pixel subset and a pixel, at the same position of the reference pixel in the reference pixel subset, in a reference block of the current block. The pixel at the same position of the reference pixel in the reference pixel subset is a pixel, of which a position relative to the reference block is the same as a position of a reference pixel in the second reference pixel set relative to the current block, in a picture where the reference block is located.

In the solution, the first calculation unit 702 is further configured to calculate a prediction value of the colour component to be predicted of the current block according to the prediction model and the reference block of the current block.

In the solution, the reference block is a picture block indicated by an inter prediction parameter of the current block.

It can be understood that, in the embodiment of the disclosure, "unit" may be part of a circuit, part of a processor, part of a program or software and the like, of course, may also be modular and may also be non-modular. In addition, each component in the embodiment may be integrated into a processing unit, each unit may also exist independently, and two or more than two units may also be integrated into a unit. The integrated unit may be implemented in a hardware form and may also be implemented in form of software function module.

When implemented in form of software function module and sold or used not as an independent product, the integrated unit may be stored in a computer-readable storage medium. Based on such an understanding, the technical solution of the embodiments substantially or parts making contributions to the conventional art or all or part of the technical solution may be embodied in form of software product, and the computer software product is stored in a storage medium, including a plurality of instructions configured to enable a computer device (which may be a personal computer, a server, a network device, etc.) or a processor to execute all or part of the operations of the method in the embodiments. The storage medium includes various media capable of storing program codes such as a U disk, a mobile hard disk, a Read-Only Memory (ROM), a Random Access Memory (RAM), a magnetic disk, or an optical disk.

Therefore, the embodiments of the disclosure provide a computer storage medium, which stores a colour component prediction program. The colour component prediction program is executed by at least one processor to implement the operations of the method as described in the abovementioned embodiments.

Figure 8:
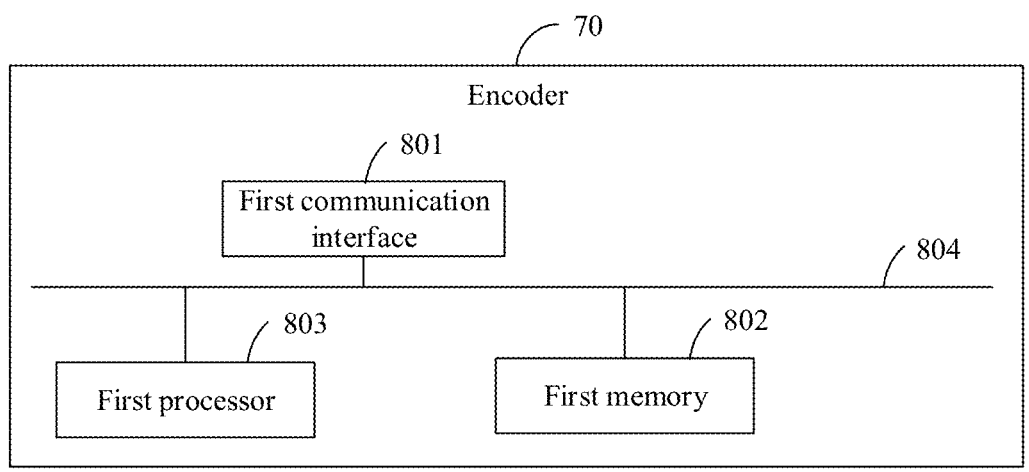
FIG. 8 is a structure diagram of specific hardware of an encoder according to an embodiment of the disclosure.

Based on the composition of the encoder 70 and the computer storage medium, referring to FIG. 8, a specific hardware structure example of the encoder 70 according to the embodiment of the disclosure is illustrated, and may include a first communication interface 801, a first memory 802, and a first processor 803. Components are coupled together through a first bus system 804. It can be understood that the first bus system 804 is configured to implement connection communication between these components. The first bus system 804 includes a data bus and also includes a power bus, a control bus and a state signal bus. However, for clear description, various buses in FIG. 8 are marked as the first bus system 804.

The first communication interface 801 is configured to receive and send a signal in a process of receiving and sending information with another external network element.

The first memory 802 is configured to store a computer program capable of running in the first processor 803.

The first processor 803 is configured to run the computer program to execute the following operations of:
  determining a first reference pixel set of a colour component to be predicted of a current block;
  determining a reference pixel subset from the first reference pixel set, the reference pixel subset including one or more candidate pixels selected from the first reference pixel set; and
  calculating a model parameter of a prediction model using the reference pixel subset, the prediction model being configured to perform cross-component prediction processing on the colour component to be predicted of the current block.

It can be understood that the first memory 802 in the embodiment of the disclosure may be a volatile memory or a nonvolatile memory, or may include both the volatile and nonvolatile memories. The nonvolatile memory may be a ROM, a Programmable ROM (PROM), an Erasable PROM (EPROM), an Electrically EPROM (EEPROM), or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DRRAM). The first memory 802 of a system and method described in the disclosure is intended to include, but not limited to, memories of these and any other proper types.

The first processor 803 may be an integrated circuit chip with a signal processing capability. In an implementation process, each operation of the method may be completed by an integrated logic circuit of hardware in the first processor 803 or an instruction in a software form. The first processor 803 may be a universal processor, a Digital Signal Processor (DSP), an Application Specific Integrated Circuit (ASIC), a Field Programmable Gate Array (FPGA) or another Programmable Logic Device (PLD), a discrete gate or transistor logical device, and a discrete hardware component. Each method, operation and logical block diagram disclosed in the embodiments of the disclosure may be implemented or executed. The universal processor may be a microprocessor or the processor may also be any conventional processor, etc. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a RAM, a flash memory, a ROM, a PROM or EEPROM, and a register. The storage medium is located in the first memory 802. The first processor 803 reads information in the first memory 802 and completes the operations of the method in combination with hardware.

It can be understood that these embodiments described in the disclosure may be implemented by hardware, software, firmware, middleware, a microcode or a combination thereof. In case of implementation with the hardware, the processing unit may be implemented in one or more ASICs, DSPs, DSP Devices (DSPDs), PLDs, FPGAS, universal processors, controllers, microcontrollers, microprocessors, other electronic units configured to execute the functions in the disclosure or combinations thereof. In case of implementation with the software, the technology of the disclosure may be implemented through the modules (for example, processes and functions) executing the functions in the disclosure. A software code may be stored in the memory and executed by the processor. The memory may be implemented in the processor or outside the processor.

As another embodiment, the first processor 803 is further configured to, when running the computer program, execute any method in the abovementioned embodiments.

The embodiment of the disclosure provides an encoder. The encoder may include the first determination unit and the first calculation unit. The first determination unit is configured to determine the first reference pixel set of the colour component to be predicted of the current block, and is further configured to determine the reference pixel subset from the first reference pixel set. The reference pixel subset includes one or more candidate pixels selected from the first reference pixel set. The first calculation unit is configured to calculate the model parameter of the prediction model using the reference pixel subset. The prediction model is configured to perform cross-component prediction processing on the colour component to be predicted of the current block. In this manner, since screening processing is performed on the first reference pixel set, unimportant reference pixels or exceptional reference pixels may be removed to reduce the number of pixels in the first reference pixel set, so that not only may the calculation complexity and memory bandwidth be reduced, but also the accuracy of the prediction model may be improved. Since the prediction model is to implement prediction processing on the colour component to be predicted through the model parameter, the prediction accuracy of the colour component to be predicted is improved, and the prediction efficiency of the video picture is improved.

Figure 9:
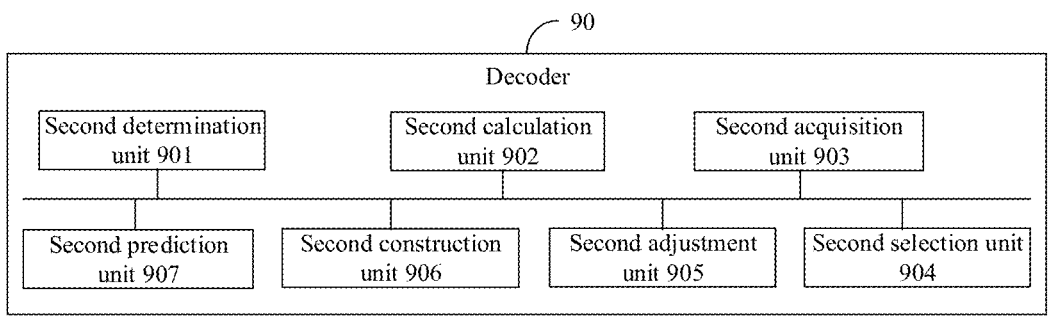
FIG. 9 is a composition structure diagram of a decoder according to an embodiment of the disclosure.

Based on the same inventive concept of the abovementioned embodiments, referring to FIG. 9, a composition structure diagram of a decoder 90 according to an embodiment of the disclosure is illustrated. As illustrated in FIG. 9, the decoder 90 may include a second determination unit 901 and a second calculation unit 902.

The second determination unit 901 is configured to determine a first reference pixel set of a colour component to be predicted of a current block.

The second determination unit 901 is further configured to determine a reference pixel subset from the first reference pixel set. The reference pixel subset includes one or more candidate pixels selected from the first reference pixel set.

The second calculation unit 902 is configured to calculate a model parameter of a prediction model using the reference pixel subset. The prediction model is configured to perform cross-component prediction processing on the colour component to be predicted of the current block.

In the solution, referring to FIG. 9, the decoder 90 may further include a second acquisition unit 903, configured to acquire reference pixels adjacent to at least one side of the current block outside the current block, the at least one side of the current block including at least one of a top side, a left side, a top-right side, or a bottom-left side, and obtain the first reference pixel set according to the acquired reference pixels.

In the solution, the second acquisition unit 903 is further configured to acquire reference pixels adjacent to at least one side of a reconstructed block within the reconstructed block, the reconstructed block being a picture block that is adjacent to the current block and has been encoded and reconstructed, and the at least one side of the reconstructed block including a bottom side, a right side, or the bottom side and the right side, and obtain the first reference pixel set according to the acquired reference pixels.

In the solution, referring to FIG. 9, the decoder 90 may further include a second selection unit 904.

The second determination unit 901 is further configured to determine candidate positions of the candidate pixels based on the at least one side of the current block or the reconstructed block.

The second selection unit 904 is configured to select reference pixels corresponding to the candidate positions from the first reference pixel set, and form the reference pixel subset using the selected reference pixels.

In the solution, the second determination unit 901 is further configured to determine the candidate positions based on pixel positions corresponding to the reference pixels adjacent to the at least one side.

In the solution, the second determination unit 901 is further configured to determine the candidate positions based on colour component intensity values corresponding to the reference pixels adjacent to the at least one side.

In the solution, the second determination unit 901 is further configured to determine the candidate positions based on pixel positions and colour component intensity values corresponding to the reference pixels adjacent to the at least one side.

In the solution, the second determination unit 901 is further configured to determine a preset candidate pixel count, the preset candidate pixel count representing the number of pixels sampled from the reference pixels adjacent to the at least one side, and determine the candidate positions according to the preset candidate pixel count and a length of the at least one side. The length of the at least one side is equal to the number of pixels on the at least one side.

In the solution, the second calculation unit 902 is further configured to calculate a first sampling interval according to the preset candidate pixel count and the length of the at least one side.

The second determination unit 901 is further configured to determine a reference point from the at least one side and determine the candidate positions according to the first sampling interval.

In the solution, referring to FIG. 9, the decoder 90 may further include a second adjustment unit 905, configured to adjust the first sampling interval to obtain a second sampling interval.

The second determination unit 901 is further configured to determine the candidate positions based on the reference point and the second sampling interval.

In the solution, the second determination unit 901 is further configured to, based on the reference point, determine a candidate position corresponding to one side of the reference point according to the first sampling interval, and determine a candidate position corresponding to the other side of the reference point according to the second sampling interval.

In the solution, the second determination unit 901 is further configured to determine a preset number K of pixels to be skipped corresponding to the at least one side, K being a positive integer more than or equal to 1, determine positions corresponding to K pixels to be skipped from a starting position and/or ending position of the at least one side, continuously skip the K pixels to be skipped from the starting position and/or ending position of the at least one side based on the positions corresponding to the K pixels to be skipped to obtain at least one new side, and determine the candidate positions based on the at least one new side and the preset candidate pixel count.

In the solution, the second selection unit 904 is further configured to acquire a neighboring pixel reconstructed value of a colour component to be predicted corresponding to the current block and a neighboring pixel reconstructed value of a colour component to be predicted corresponding to a reference block based on the reference pixel subset. The current block is in an Nth video picture, and the reference block is in an (N−1)th video picture.

The second calculation unit 902 is further configured to calculate the model parameter according to the neighboring pixel reconstructed value of the colour component to be predicted corresponding to the current block and the neighboring pixel reconstructed value of the colour component to be predicted corresponding to the reference block.

In the solution, referring to FIG. 9, the decoder 90 may further include a second construction unit 906 and a second prediction unit 907.

The second construction unit 906 is configured to construct the prediction model according to the model parameter.

The second prediction unit 907 is configured to perform prediction processing on the colour component to be predicted of the current block through the prediction model to obtain a prediction value corresponding to the colour component to be predicted.

In the solution, the second determination unit 901 is further configured to determine one or more first neighboring pixels of the current block as the first reference pixel set. The first neighboring pixel is a pixel adjacent to a vertical side of the current block, a horizontal side of the current block, or the vertical side and horizontal side of the current block.

In the solution, the second determination unit 901 is further configured to, when the first neighboring pixel is outside the current block, determine that the vertical side of the current block is a column adjacent to the left outside the current block and the horizontal side of the current block is a row adjacent to the top outside the current block.

In the solution, the second determination unit 901 is further configured to, when the first neighboring pixel is in the current block, determine that the vertical side of the current block is a right-side column in the current block and the horizontal side of the current block is a bottom-side row in the current block.

In the solution, the second determination unit 901 is further configured to determine the candidate positions of the candidate pixels on a side of the current block, the side of the current block being the vertical side or horizontal side of the current block, select pixels at the candidate positions from the first reference pixel set, and form the reference pixel subset using the selected pixels.

In the solution, the second determination unit 901 is further configured to determine the candidate positions of the candidate pixels according to positions of the pixels in the first reference pixel set.

In the solution, the second determination unit 901 is further configured to determine the candidate positions of the candidate pixels according to colour component intensities of the pixels in the first reference pixel set.

In the solution, the second determination unit 901 is further configured to determine the candidate positions of the candidate pixels according to positions and colour component intensities of the pixels in the first reference pixel set.

In the solution, the second determination unit 901 is further configured to determine a preset candidate pixel count, the preset candidate pixel count indicating the number of pixels selected from the side of the current block, and determine the candidate positions of the candidate pixels according to the first preset pixel count and a length of the side of the current block. The length of the side of the current block is equal to the number of reference pixels on the side of the current block in the first reference pixel set.

In the solution, the second calculation unit 902 is further configured to calculate a first sampling interval according to the length of the side of the current block and the preset candidate pixel count.

In the solution, the second adjustment unit 905 is configured to adjust the first sampling interval to obtain a second sampling interval.

In the solution, the second determination unit 901 is further configured to determine a reference point on the side of the current block and determine the candidate positions on the side of the current block according to the first sampling interval from the reference point.

In the solution, the second determination unit 901 is further configured to determine a reference point on the side of the current block and determine candidate positions on two sides of the reference point according to the first sampling interval.

In the solution, the second determination unit 901 is further configured to determine a reference point on the side of the current block and determine the candidate positions on the side of the current block according to the second sampling interval from the reference point.

In the solution, the second determination unit 901 is further configured to determine a reference point on the side of the current block and determine the candidate positions on the two sides of the reference point according to the second sampling interval.

In the solution, the second determination unit 901 is further configured to determine a reference point on the side of the current block, determine a candidate position corresponding to one side of the reference point according to the first sampling interval, and determine a candidate position corresponding to the other side of the reference point according to the second sampling interval.

In the solution, the second determination unit 901 is further configured to determine a preset number K of pixels to be skipped of the side of the current block, K being a nonnegative integer, and set a Kth pixel position from an end position of the side of the current block as the reference point. The end position of the side of the current block is a starting pixel position or ending pixel position of the side of the current block.

In the solution, the second calculation unit 902 is further configured to calculate the model parameter of the prediction model using a reference pixel in the reference pixel subset and a pixel, at the same position of the reference pixel in the reference pixel subset, in a reference block of the current block. The pixel at the same position of the reference pixel in the reference pixel subset is a pixel, of which a position relative to the reference block is the same as a position of a reference pixel in the second reference pixel set relative to the current block, in a picture where the reference block is located.

In the solution, the second calculation unit 902 is further configured to calculate the prediction value of the colour component to be predicted of the current block according to the prediction model and the reference block of the current block.

In the solution, the reference block is a picture block indicated by an inter prediction parameter of the current block.

It can be understood that, in the embodiment of the disclosure, "unit" may be part of a circuit, part of a processor, part of a program or software and the like, of course, may also be modular and may also be non-modular. In addition, each component in the embodiment may be integrated into a processing unit, each unit may also exist independently, and two or more than two units may also be integrated into a unit. The integrated unit may be implemented in a hardware form and may also be implemented in form of software function module.

When implemented in form of a software functional module and sold or used not as an independent product, the integrated unit may be stored in a computer-readable storage medium. Based on such an understanding, the embodiment provides a computer storage medium, which stores a colour component prediction program. The colour component prediction program is executed by a second processor to implement any method as described in the abovementioned embodiments.

Figure 10:
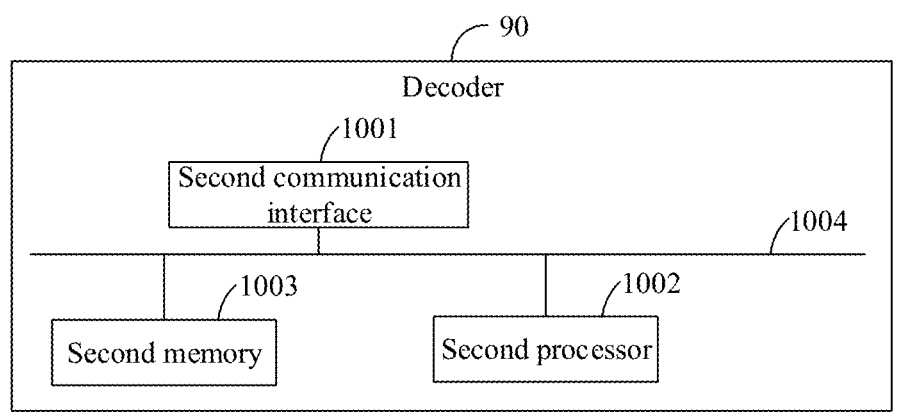
FIG. 10 is a structure diagram of specific hardware of a decoder according to an embodiment of the disclosure.

Based on the composition of the decoder 90 and the computer storage medium, referring to FIG. 10, a specific hardware structure of the decoder 90 according to the embodiment of the disclosure is illustrated, and may include a second communication interface 1001, a second memory 1002, and a second processor 1003. Components are coupled together through a second bus system 1004. It can be understood that the second bus system 1004 is configured to implement connection communication between these components. The second bus system 1004 includes a data bus and also includes a power bus, a control bus and a state signal bus. However, for clear description, various buses in FIG. 10 are marked as the second bus system 1004.

The second communication interface 1001 is configured to receive and send a signal in a process of receiving and sending information with another external network element.

The second memory 1002 is configured to store a computer program capable of running in the second processor 1003.

The second processor 1003 is configured to run the computer program to execute the following operations of:
  determining a first reference pixel set of a colour component to be predicted of a current block;
  determining a reference pixel subset from the first reference pixel set, the reference pixel subset including one or more candidate pixels selected from the first reference pixel set; and
  calculating a model parameter of a prediction model using the reference pixel subset, the prediction model being configured to perform cross-component prediction processing on the colour component to be predicted of the current block.

As another embodiment, the second processor 1003 is further configured to run the computer program to execute any method in the abovementioned embodiments.

It can be understood that the second memory 1002 has a hardware function similar to that of the first memory 802 and the second processor 1003 has a hardware function similar to that of the first processor 803, which are not elaborated herein.

The embodiment of the disclosure provides a decoder. The decoder may include the second determination unit and the second calculation unit. The second determination unit is configured to determine the first reference pixel set of the colour component to be predicted of the current block, and is further configured to determine the reference pixel subset from the first reference pixel set. The reference pixel subset includes one or more candidate pixels selected from the first reference pixel set. The second calculation unit is configured to calculate the model parameter of the prediction model using the reference pixel subset. The prediction model is configured to perform cross-component prediction processing on the colour component to be predicted of the current block. In this manner, since screening processing is performed on the first reference pixel set, unimportant reference pixels or exceptional reference pixels may be removed to reduce the number of pixels in the first reference pixel set, so that not only may the calculation complexity and memory bandwidth be reduced, but also the accuracy of the prediction model may be improved. Since the prediction model is to implement prediction processing on the colour component to be predicted through the model parameter, the prediction accuracy of the colour component to be predicted is improved, and the prediction efficiency of the video picture is improved.

It is to be noted that, in the disclosure, terms "include" and "contain" or any other variant thereof are intended to cover nonexclusive inclusions, so that a process, method, object or device including a series of elements not only includes these elements but also includes other elements which are not clearly listed or further includes elements intrinsic to the process, the method, the object or the device. Under the condition of no more limitations, an element defined by the statement "including a/an . . . " does not exclude existence of the same other elements in a process, method, object or device including the element.

The sequence numbers of the embodiments of the disclosure are adopted not to represent superiority and inferiority of the embodiments but only for description.

The methods disclosed in some method embodiments provided in the disclosure may be freely combined without conflicts to obtain new method embodiments.

The characteristics disclosed in some product embodiments provided in the disclosure may be freely combined without conflicts to obtain new product embodiments.

The characteristics disclosed in some method or device embodiments provided in the disclosure may be freely combined without conflicts to obtain new method embodiments or device embodiments.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

INDUSTRIAL APPLICABILITY

In the embodiments of the disclosure, the first reference pixel set of the colour component to be predicted of the current block is determined at first, then the reference pixel subset is determined from the first reference pixel set, the reference pixel subset including one or more candidate pixels selected from the first reference pixel set, and the model parameter of the prediction model is calculated using the reference pixel subset. The prediction model is configured to perform cross-component prediction processing on the colour component to be predicted of the current block. In this manner, since screening processing is performed on the first reference pixel set, unimportant reference pixels or exceptional reference pixels may be removed to further reduce the number of pixels in the first reference pixel set, so that not only may the calculation complexity and memory bandwidth be reduced, but also the accuracy of the prediction model may be improved. Since the prediction model is to implement prediction processing on the colour component to be predicted through the model parameter, the prediction accuracy of the colour component to be predicted is improved, and the prediction efficiency of the video picture is improved.

The invention claimed is:

1. A method for predicting a colour component, applied to a decoder and comprising:
  determining a first reference sample set of a colour component to be predicted of a current block;
  determining a reference sample subset from the first reference sample set, the reference sample subset comprising one or more candidate samples selected from the first reference sample set; and calculating a model parameter of a prediction model according to positions of reference samples in the reference sample subset, the prediction model being configured to perform prediction processing on the colour component to be predicted of the current block.

2. The method of claim 1, further comprising:
calculating a prediction value of the colour component to be predicted of the current block according to the model parameter of the prediction model and a reference block of the current block.

3. The method of claim 2, wherein the reference block is a picture block indicated by an inter prediction parameter of the current block.

4. The method of claim 1, wherein determining the first reference sample set of the colour component to be predicted of the current block comprises:
acquiring reference samples adjacent to at least one side of the current block, and obtaining the first reference sample set according to the acquired reference samples; or,
determining one or more first neighboring samples of the current block as the first reference sample set.

5. The method of claim 4, wherein the at least one side of the current block comprises at least one of a top side, a left side, a top-right side, or a bottom-left side.

6. The method of claim 1, wherein determining the first reference sample set of the colour component to be predicted of the current block comprises:
acquiring reference samples adjacent to at least one side of a reconstructed block within the reconstructed block, the reconstructed block being a picture block that is adjacent to the current block, and the at least one side of the reconstructed block comprising a bottom side, a right side, or the bottom side and the right side; and
obtaining the first reference sample set according to the acquired reference samples.

7. The method of claim 1, wherein determining the reference sample subset from the first reference sample set comprises:
determining candidate positions of the one or more candidate samples based on the at least one side of the current block or a reconstructed block; and
selecting reference samples corresponding to the candidate positions from the first reference sample set, and forming the reference sample subset using the selected reference samples.

8. The method of claim 7, wherein determining the candidate positions of the one or more candidate samples based on the at least one side of the current block or the reconstructed block comprises:
determining the candidate positions of the one or more candidate samples based on sample positions corresponding to reference samples adjacent to the at least one side; or
determining the candidate positions of the one or more candidate samples based on colour component intensity values corresponding to the reference samples adjacent to the at least one side; or
determining the candidate positions of the one or more candidate samples based on sample positions and colour component intensity values corresponding to the reference samples adjacent to the at least one side.

9. The method of claim 1, wherein calculating the model parameter of the prediction model comprises:

acquiring a neighboring sample reconstructed value of a colour component to be predicted corresponding to the current block and a neighboring sample reconstructed value of a colour component to be predicted corresponding to a reference block based on the reference sample subset, the current block being in an Nth video picture, and the reference block being in an (N−1)th video picture; and
calculating the model parameter according to the neighboring sample reconstructed value of the colour component to be predicted corresponding to the current block and the neighboring sample reconstructed value of the colour component to be predicted corresponding to the reference block.

10. A decoder, comprising a memory and a processor, wherein
the memory is configured to store a computer program capable of running in the processor; and
the processor is configured to run the computer program to execute a method for predicting a colour component, comprising:
determining a first reference sample set of a colour component to be predicted of a current block;
determining a reference sample subset from the first reference sample set, the reference sample subset comprising one or more candidate samples selected from the first reference sample set; and
calculating a model parameter of a prediction model according to positions of reference samples in the reference sample subset, the prediction model being configured to perform prediction processing on the colour component to be predicted of the current block.

11. A method for predicting a colour component, applied to an encoder and comprising:
determining a first reference sample set of a colour component to be predicted of a current block;
determining a reference sample subset from the first reference sample set, the reference sample subset comprising one or more candidate samples selected from the first reference sample set; and
calculating a model parameter of a prediction model according to positions of reference samples in the reference sample subset, the prediction model being configured to perform prediction processing on the colour component to be predicted of the current block.

12. The method of claim 11, further comprising:
calculating a prediction value of the colour component to be predicted of the current block according to the model parameter of the prediction model and a reference block of the current block.

13. The method of claim 12, wherein the reference block is a picture block indicated by an inter prediction parameter of the current block.

14. The method of claim 11, wherein determining the first reference sample set of the colour component to be predicted of the current block comprises:
acquiring reference samples adjacent to at least one side of the current block, and obtaining the first reference sample set according to the acquired reference samples; or,
determining one or more first neighboring samples of the current block as the first reference sample set.

15. The method of claim 14, wherein the at least one side of the current block comprises at least one of a top side, a left side, a top-right side, or a bottom-left side.

16. The method of claim 11, wherein determining the first reference sample set of the colour component to be predicted of the current block comprises:
- acquiring reference samples adjacent to at least one side of a reconstructed block within the reconstructed block, the reconstructed block being a picture block that is adjacent to the current block, and the at least one side of the reconstructed block comprising a bottom side, a right side, or the bottom side and the right side; and
- obtaining the first reference sample set according to the acquired reference samples.

17. The method of claim 11, wherein determining the reference sample subset from the first reference sample set comprises:
- determining candidate positions of the one or more candidate samples based on the at least one side of the current block or a reconstructed block; and
- selecting reference samples corresponding to the candidate positions from the first reference sample set, and forming the reference sample subset using the selected reference samples.

18. The method of claim 17, wherein determining the candidate positions of the one or more candidate samples based on the at least one side of the current block or the reconstructed block comprises:
- determining the candidate positions of the one or more candidate samples based on sample positions corresponding to reference samples adjacent to the at least one side; or
- determining the candidate positions of the one or more candidate samples based on colour component intensity values corresponding to the reference samples adjacent to the at least one side; or
- determining the candidate positions of the one or more candidate samples based on sample positions and colour component intensity values corresponding to the reference samples adjacent to the at least one side.

19. The method of claim 11, wherein calculating the model parameter of the prediction model comprises:
- acquiring a neighboring sample reconstructed value of a colour component to be predicted corresponding to the current block and a neighboring sample reconstructed value of a colour component to be predicted corresponding to a reference block based on the reference sample subset, the current block being in an Nth video picture, and the reference block being in an (N−1)th video picture; and
- calculating the model parameter according to the neighboring sample reconstructed value of the colour component to be predicted corresponding to the current block and the neighboring sample reconstructed value of the colour component to be predicted corresponding to the reference block.

20. A non-transitory computer-readable storage medium, having a colour component prediction program stored thereon, wherein the colour component prediction program, when executed by a processor, enables the processor to perform the method of claim 11 to generate a bitstream.

* * * * *